(12) United States Patent
Saito

(10) Patent No.: US 10,010,061 B2
(45) Date of Patent: Jul. 3, 2018

(54) SPINNING REEL

(71) Applicant: Shimano Inc., Sakai, Osaka (JP)

(72) Inventor: Kei Saito, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 345 days.

(21) Appl. No.: 15/046,689

(22) Filed: Feb. 18, 2016

(65) Prior Publication Data

US 2016/0270381 A1 Sep. 22, 2016

(30) Foreign Application Priority Data

Mar. 18, 2015 (JP) .................................. 2015-055347
Jun. 8, 2015 (JP) .................................. 2015-115620

(51) Int. Cl.
*A01K 89/01* (2006.01)
*A01K 89/015* (2006.01)
*A01K 89/00* (2006.01)
*A01K 89/027* (2006.01)

(52) U.S. Cl.
CPC ........ *A01K 89/0189* (2015.05); *A01K 89/006* (2013.01); *A01K 89/0117* (2013.01); *A01K 89/027* (2013.01)

(58) Field of Classification Search
CPC .. A01K 89/01; A01K 89/0117; A01K 89/027; A01K 89/029; A01K 89/006
See application file for complete search history.

(56) References Cited

U.S. PATENT DOCUMENTS

| 2,981,495 | A | * | 4/1961 | King | A01K 89/015 |
| | | | | | 242/265 |
| 5,118,048 | A | * | 6/1992 | Childre | A01K 89/027 |
| | | | | | 242/245 |
| 5,443,218 | A | * | 8/1995 | Ciocca | A01K 89/01 |
| | | | | | 242/256 |

(Continued)

FOREIGN PATENT DOCUMENTS

| EP | 2248418 A1 | 11/2010 |
| JP | S5915890 Y | 5/1984 |

(Continued)

OTHER PUBLICATIONS

Extended European Search Report dated May 18, 2017 for EP Application No. 16192724.9, 12 pp.

(Continued)

*Primary Examiner* — Emmanuel M Marcelo

(57) ABSTRACT

A spinning reel includes a rotation transmission mechanism that transmits a rotation of a handle to a rotor. The rotation transmission mechanism includes a drive shaft and a drive gear. The drive shaft is mounted to the reel unit so as to be rotatable about an axis arranged skew to the spool shaft. The drive gear is mounted to the drive shaft so as to be unitarily rotatable therewith. The spinning reel includes a rotation control mechanism mounted between the handle and the drive shaft. The rotation control mechanism transmits the rotation of the handle to the drive shaft only when the handle is rotated in a direction corresponding to the fishing-line winding direction. The rotation control mechanism includes a handle brake that applies a braking force to the rotation of the handle when the handle is rotated in a reverse direction relative to the direction.

20 Claims, 14 Drawing Sheets

(56) References Cited

U.S. PATENT DOCUMENTS

| | | | | |
|---|---|---|---|---|
| 5,779,171 | A * | 7/1998 | Milano, Jr. | A01K 89/0117 192/48.6 |
| 7,216,825 | B2 * | 5/2007 | Oishi | A01K 89/015 242/247 |
| 7,290,727 | B1 * | 11/2007 | Matsuda | A01K 89/0117 242/238 |
| 7,464,891 | B2 * | 12/2008 | Bao-Coutado | A01K 89/033 242/317 |
| 2001/0038052 | A1 * | 11/2001 | Oishi | A01K 89/015 242/255 |
| 2007/0007377 | A1 * | 1/2007 | Miyazaki | A01K 89/033 242/245 |
| 2011/0315801 | A1 * | 12/2011 | Hayashi | A01K 89/0117 242/247 |
| 2012/0048981 | A1 * | 3/2012 | Ohara | A01K 89/0108 242/230 |
| 2013/0220050 | A1 * | 8/2013 | Koike | A01K 89/00 74/439 |
| 2015/0122930 | A1 * | 5/2015 | Ohara | F16C 33/765 242/321 |
| 2017/0172131 | A1 * | 6/2017 | Toake | A01K 89/045 |

FOREIGN PATENT DOCUMENTS

| | | | | |
|---|---|---|---|---|
| JP | 2008029299 A | * | 2/2008 | A01K 89/0102 |
| JP | 2012016355 A | | 1/2012 | |
| JP | 2012024028 A | | 2/2012 | |

OTHER PUBLICATIONS

Extended European Search Report dated May 18, 2017 for corresponding EP Application No. 16192724.9, 12 pages.

* cited by examiner

SPINNING REEL

CROSS-REFERENCE TO RELATED APPLICATIONS

This application is based upon and claims the benefit of priority to Japanese Patent Applications No. 2015-055347, filed on Mar. 18, 2015, and No. 2015-115620, filed on Jun. 8, 2015, the entire contents of both of which are incorporated herein by reference.

BACKGROUND

Technical Field

The present specification relates to a spinning reel, particularly to a spinning reel capable of forwardly reeling out a fishing line.

Description of Background Information

Lever brake spinning reels are a type of spinning reel configured to reversely rotate a rotor and simultaneously brake the rotor so as to prevent twisting of a thin fishing line in reeling out the fishing line. Some of the lever brake spinning reels are equipped with a one-way clutch mounted between a handle shaft and a drive shaft so as to prevent reverse rotation of a handle even when the rotor is reversely rotated (see e.g., Japan Examined Utility Model Publication No. S59-15890).

In the reel described in Japan Examined Utility Model Publication No. S59-15890, the handle and the rotor are configured to be coupled or decoupled by the one-way clutch in accordance with the rotational direction of the handle and that of the rotor. When the rotor is rotated in a fishing-line releasing direction without the handle being held, chances are that the handle is reversely rotated due to slight friction of the one-way clutch or so forth and is moved to a position that the weight of the handle acts as an urging force to rotate the rotor in a fishing-line winding direction. When this situation occurs, the handle inevitably swings back and forth like a pendulum in accordance with the rotation of the rotor in the fishing-line releasing direction.

BRIEF SUMMARY

It is an object of the present specification to prevent the handle from moving in accordance with the rotation of the rotor in the fishing-line releasing direction.

A spinning reel according to the present specification is a type of reel configured to forwardly reel out a fishing line. The spinning reel includes a reel unit, a handle, a spool shaft, a spool, a rotor, a rotation transmission mechanism and a rotation control mechanism. The handle is rotatably mounted to a lateral part of the reel unit. The spool shaft is mounted to the reel unit so as to be movable back and forth. The spool for winding the fishing line is mounted to a front part of the spool shaft. The rotor winds the fishing line onto the spool. The rotor is mounted to the reel unit so as to be rotatable about the spool shaft in both a fishing-line winding direction and a fishing-line releasing direction. The rotation transmission mechanism is configured to transmit a rotation of the handle to the rotor. The rotation transmission mechanism includes a drive shaft, a drive gear and a pinion gear. The drive shaft is mounted to the reel unit so as to be rotatable about an axis arranged skew to the spool shaft. The drive gear is mounted to the drive shaft so as to be unitarily rotatable therewith. The pinion gear is mounted to the spool shaft so as to be rotatable thereabout. The pinion gear is meshed with the drive gear. The rotation control mechanism is mounted between the handle and the drive shaft. The rotation control mechanism is configured to transmit the rotation of the handle to the drive shaft only when the handle is rotated in a direction corresponding to the fishing-line winding direction. The rotation control mechanism includes a handle brake portion. The handle brake portion is configured to apply a braking force to the rotation of the handle when the handle is rotated in a reverse direction relative to the direction corresponding to the fishing-line winding direction.

In the spinning reel, when the handle is rotated in the direction corresponding to the fishing-line winding direction, the rotation of the handle is configured to be transmitted to the rotor through the rotation control mechanism and the rotation transmission mechanism. Accordingly, the rotor is rotated in the fishing-line winding direction. When the handle is rotated in the reverse direction relative to the direction corresponding to the fishing-line winding direction, the handle brake portion is configured to apply a braking force to the rotation of the handle. Therefore, even when the rotor is rotated in the fishing-line releasing direction, the handle is configured not to be moved.

The rotation control mechanism can include a one-way roller clutch. The one-way roller clutch can be configured to transmit the rotation of the handle to the drive shaft only when the handle is rotated in the direction corresponding to the fishing-line winding direction. In this case, the rotation of the handle is configured not to be transmitted to the drive shaft when the handle is rotated in the reverse direction relative to the direction corresponding to the fishing-line winding direction. Thus, the rotation of the handle can be reliably braked when the handle is rotated in the reverse direction relative to the direction corresponding to the fishing-line winding direction.

The rotation control mechanism can include a handle stopper portion. The handle stopper portion can be configured to stop the rotation of the handle at a predetermined rotational phase when the handle is rotated in the reverse direction relative to the direction corresponding to the fishing-line winding direction. In this case, the rotation of the handle is configured to be stopped at the predetermined rotational phase.

The handle brake portion can be a spring member mounted between the rotation control mechanism and the reel unit. In this case, the handle brake portion can be simply constructed by the spring member.

The spring member can be made of a metallic spring wire rod. In this case, the handle brake portion can be more simply constructed by metal working of the metallic spring wire rod.

The spring member can include a curved part and a spring hook part. The curved part can be frictionally engaged with one of the rotation control mechanism and the reel unit. The curved part can be configured to be tightened when the handle is rotated in the reverse direction relative to the direction corresponding to the fishing-line winding direction, and can be configured to be loosened when the handle is rotated in the direction corresponding to the fishing-line winding direction. The spring hook part can bend from the curved part and can be hooked to the other of the rotation control mechanism and the reel unit. In this case, the curved part is configured to be loosened when the handle is rotated in the direction corresponding to the fishing-line winding direction. Thus, the handle is configured not to be braked. The curved part is configured to be tightened and frictionally engaged with one of the rotation control mechanism and the reel unit when the handle is rotated in the reverse direction relative to the direction corresponding to the fishing-line winding direction. Thus, the handle is configured to be braked. Consequently, the handle can be herein braked in accordance with the rotational direction of the handle.

The one-way roller clutch can include an inner race, an outer race, a plurality of rollers and a holding member. The inner race can be mounted to one of the drive shaft and the handle so as to be unitarily rotatable therewith. The outer race can be mounted to the other of the drive shaft and the handle so as to be unitarily rotatable therewith. The plural rollers can be disposed between the inner race and the outer race and can be circumferentially aligned at intervals. Each of the rollers can be circumferentially movable in a transmission allowed position for allowing transmission of the rotation and a transmission prevented position for preventing transmission of the rotation. The holding member can arrange the rollers to be circumferentially aligned at intervals. In this case, the rotation of the handle is configured not to be transmitted to the drive shaft from the inner race (or the outer race) through the outer race (or the inner race) when the handle is rotated in the reverse direction relative to the fishing-line winding direction.

The one-way roller clutch can be constructed such that the inner race is mounted to the drive shaft so as to be unitarily rotatable therewith, and the outer race is mounted to the handle so as to be unitarily rotatable therewith. The handle brake portion can include a pawl member, a spring member, a brake member having a ring shape, and an elastic ring. The pawl member can be pivotably mounted to the holding member. The spring member can include a curved part and a hook part. The curved part can be frictionally engaged with the reel unit, and can be rotatable about a rotational center of the handle. The curved part can be configured to be loosened when the handle is rotated in the direction corresponding to the fishing-line winding direction, and can be configured to be tightened when the handle is rotated in the reverse direction relative to the direction corresponding to the fishing-line winding direction. The hook part can be disposed on one end of the curved part, and can be hooked to a tip of the pawl member. The brake member can be mounted to the reel unit so as to be rotatable about the drive shaft. The brake member can include a plurality of internal teeth enabling the tip of the pawl member to be engaged therewith. The elastic ring can be disposed between the reel unit and the brake member. The elastic ring can cause the brake member to be frictionally engaged with the reel unit.

In this case, when the handle is rotated in the reverse direction, the holding member is configured to be reversely rotated in conjunction with the handle. When the holding member is reversely rotated, the curved part of the spring member is configured to be tightened. Thus, the hook part pulls the pawl member. Accordingly, the tip of the pawl member is urged by the hook part, and is caused to pivot radially outward. As a result, the tip of the pawl member is engaged with the internal teeth, and the brake member is reversely rotated. The brake member is frictionally engaged with the reel unit by the elastic ring. Hence, the revere rotation of the handle is braked by the brake member through the pawl member and the holding member.

Contrarily, when the handle is rotated in the direction corresponding to the fishing-line winding direction, the curved part is configured to be loosened. Accordingly, the tip of the pawl member is caused to pivot radially inward by the hook part. Therefore, the pawl member is disengaged from the internal teeth, and the handle is not braked. Consequently, the handle can be herein reliably braked in accordance with the rotational direction of the handle. Additionally, the brake member and the reel unit are frictionally engaged by the elastic ring. Hence, a frictional force is stabilized.

The reel unit can include a spring holding member having an annular shape. The spring holding member can include a first annular groove enabling the curved part of the spring member to be frictionally engaged therewith. In this case, the spring member can be held by the annular spring holding member. Hence, the other constituent elements of the reel unit are simply constructed.

The reel unit can include an annular member. The annular member can be disposed on an outer peripheral side of the spring holding member, and can include a second annular groove on an outer peripheral surface thereof. The second annular groove can enable the elastic ring to be mounted thereto. In this case, the elastic ring is mounted to the annular member. Hence, the other constituent elements of the reel unit are simply constructed.

The rotation control mechanism can include a handle stopper portion. The handle stopper portion can be configured to stop the rotation of the handle at a predetermined rotational phase when the handle is rotated in the reverse direction relative to the direction corresponding to the fishing-line winding direction. The handle stopper portion can include a protruding part. The protruding part can protrude from the annular member to an inner peripheral side so as to be contactable to the pawl member. In this case, the rotation of the handle is stopped together with the rotation of the holding member when the pawl member, configured to pivot while being engaged with the internal teeth of the brake member by the rotation of the holding member, is contacted to the protruding part.

The reel unit can include a reel body and a lid member. The reel body can include a mechanism accommodation space in an interior thereof. The lid member can be a member for closing the reel body. The spring holding member and the annular member can be non-rotatably and detachably mountable to any one of the reel body and the lid member from outside. In this case, the one-way roller clutch, the spring holding member, the annular member and so forth are commonly usable between the spinning reel of the right handle type and that of the left handle type.

Overall, according to the present specification, the handle brake portion is configured to apply a braking force to the rotation of the handle when the handle is rotated in the reverse direction relative to the direction corresponding to the fishing-line winding direction. Therefore, the handle is prevented from moving in accordance with the rotation of the rotor in the fishing-line releasing direction.

BRIEF DESCRIPTION OF THE DRAWINGS

Referring now to the attached drawings which form a part of this original disclosure.

DETAILED DESCRIPTION OF EMBODIMENTS

First Preferred Embodiment

<Entire Construction>

Figure 1:
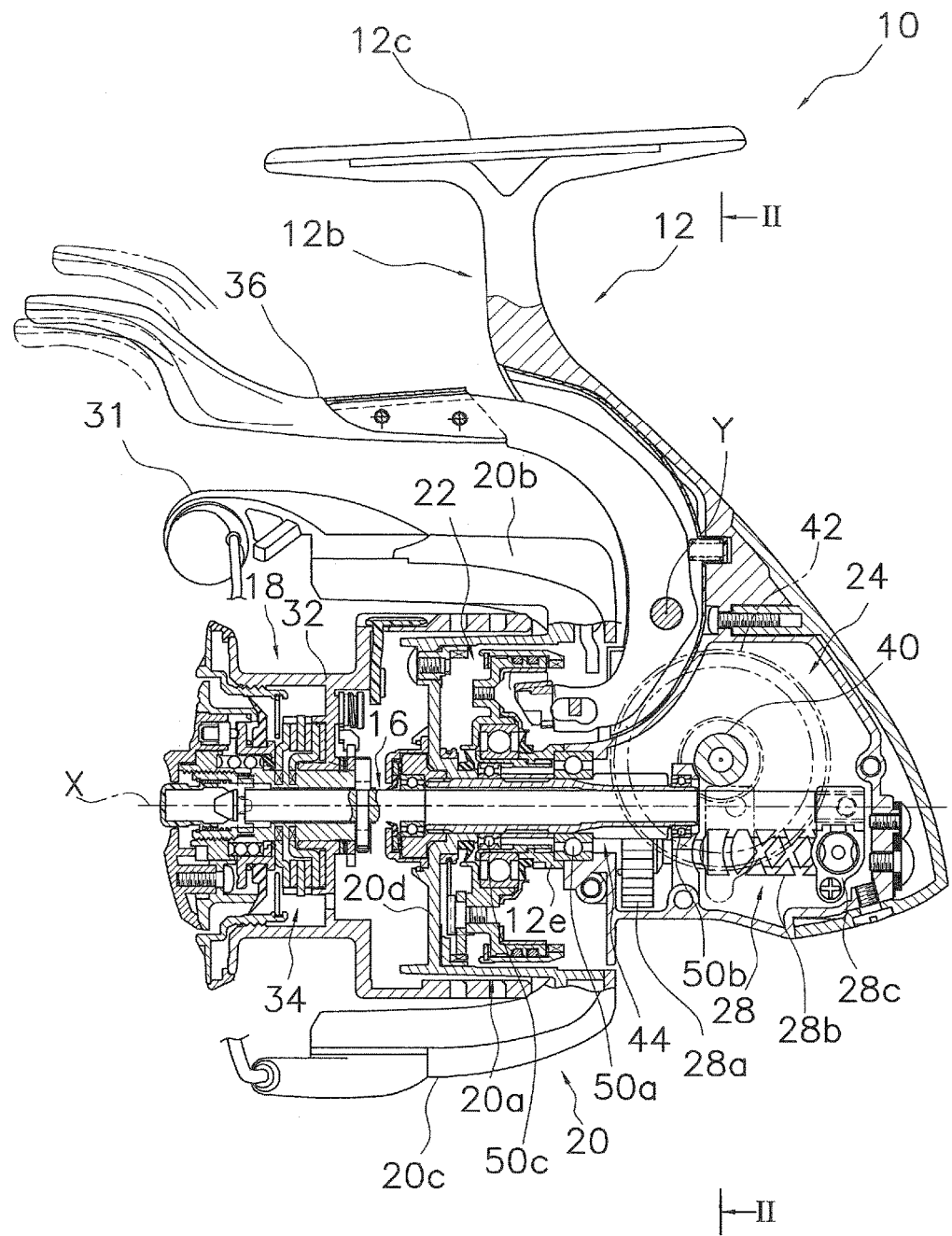
FIG. 1 is a cross-sectional side view of a spinning reel according to a first preferred embodiment of the present specification.
Figure 2:
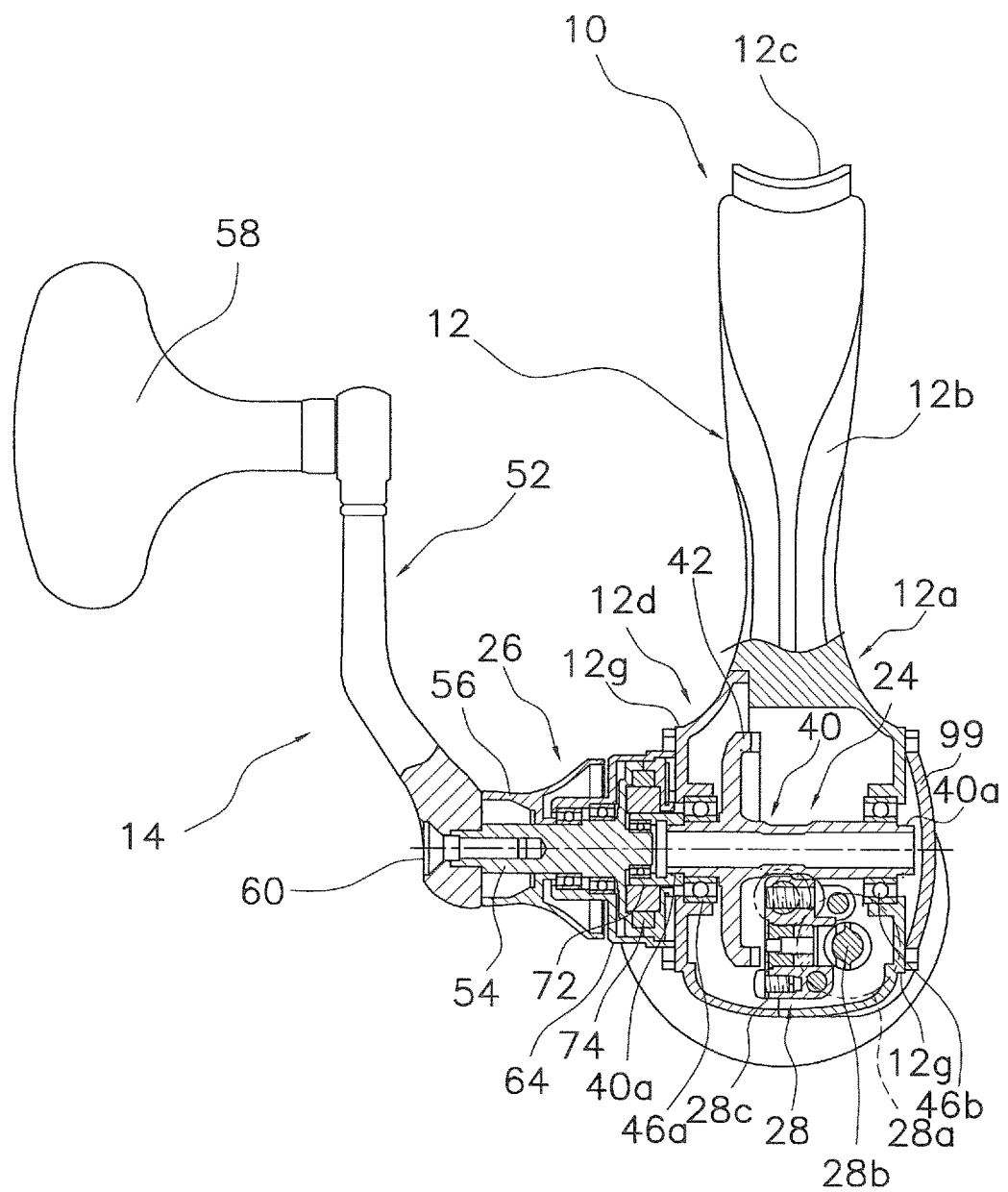
FIG. 2 is a cross-sectional view of the spinning reel according to the first preferred embodiment taken along line II-II in FIG. 1.

As shown in FIGS. 1 and 2, a spinning reel 10 employing a first preferred embodiment of the present specification is capable of forwardly reeling out a fishing line. The spinning reel 10 is a lever brake reel configured to wind up the fishing line about a first axis X. The spinning reel 10 includes a reel unit 12, a handle 14 (see FIG. 2), a spool shaft 16, a spool 18 for winding up the fishing line, a rotor 20, a rotor brake unit 22, a rotation transmission mechanism 24 and a rotation control mechanism 26 (see FIG. 2). The handle 14 is so-called a left handle rotatably mounted to the left lateral part of the reel unit 12. The spool shaft 16 is mounted to the reel unit 12 such that the spool shaft 16 is movable back and forth. The spool 18 is mounted to the front part of the spool shaft 16. The rotor 20 is mounted to the reel unit 12 and is rotatable about the spool shaft 16 in a fishing-line winding direction and a fishing-line releasing direction. The rotor 20 is capable of winding the fishing line onto the spool 18. The rotor brake unit 22 is capable of braking the fishing-line releasing directional rotation (reverse rotation) of the rotor 20. The rotation transmission mechanism 24 is configured to transmit the rotation of the handle 14 to the rotor 20. The rotation transmission mechanism 24 is an example of a rotation transmission means. The rotation control mechanism 26 is mounted between the handle 14 and the rotation transmission mechanism 24, and is configured to transmit the rotation of the handle 14 to the rotation transmission mechanism 24 when the rotation of the handle 14 is a fishing-line winding directional rotation. The rotation control mechanism 26 is an example of a rotation control means.

Figure 9:
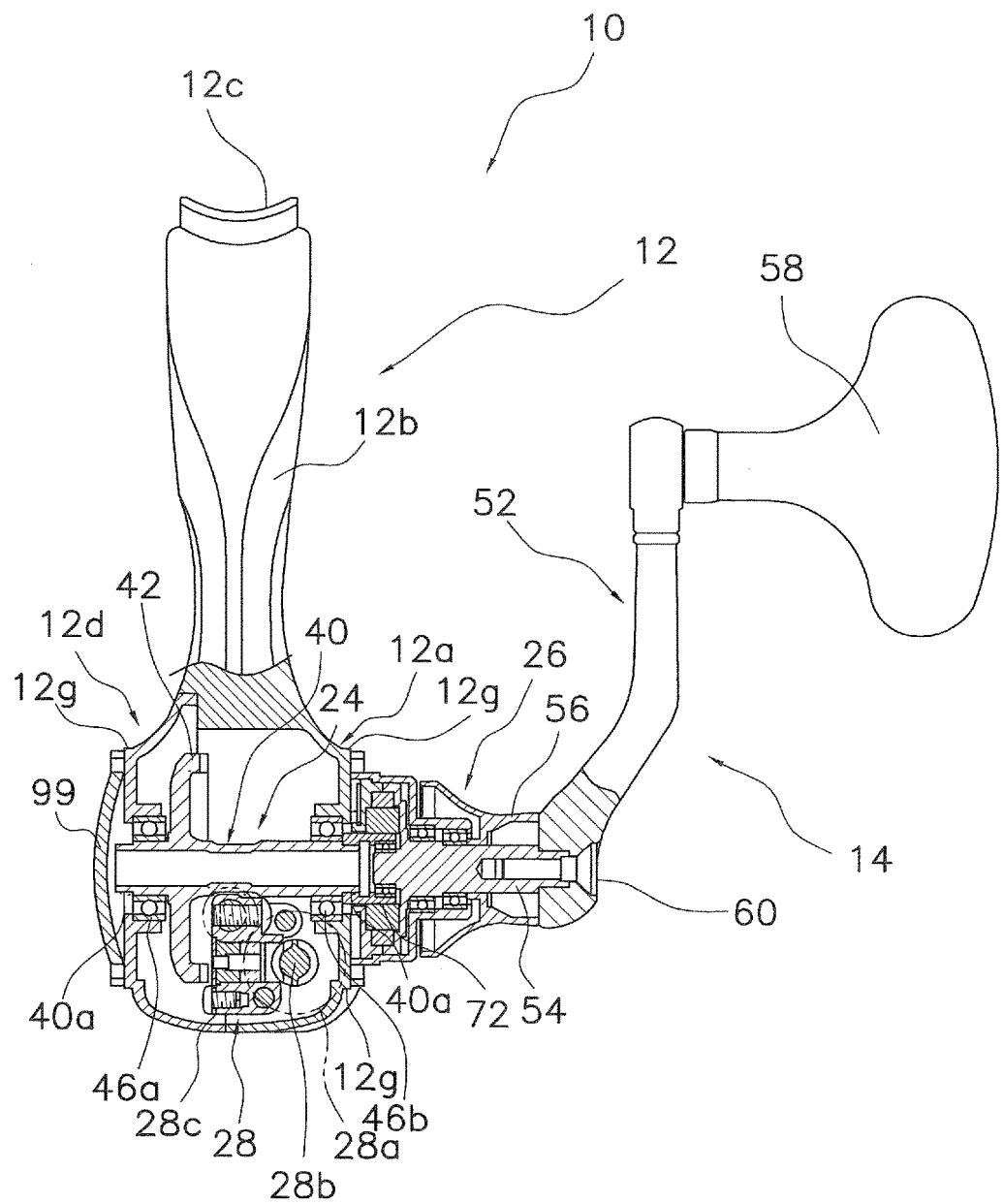
FIG. 9 is a cross-sectional view of the right handle spinning reel and corresponds to FIG. 2.

The reel unit 12 includes a fishing rod attachment 12c, which is a back-and-forth elongated part attachable to a fishing rod, a reel body 12a, a leg 12b and a lid member 12d (see FIG. 2). The reel body 12a includes a mechanism mount space in the interior thereof. The reel body 12a is integrally formed with the leg 12b, and a lateral part thereof is opened. The opened part of the reel body 12a is closed by the lid member 12d. An attachment member 12e is mounted to the front part of the reel body 12a. The attachment member 12e is a flanged tubular member made of a metal. Each of the reel body 12a and the lid member 12d includes a circular mount part 12g (see FIG. 2) on the outer lateral surface thereof. The circular mount part 12g is a part to which the rotation control mechanism 26 is mountable, and has, for instance, a circular shape. As shown in FIGS. 2 and 9, instead of the rotation control mechanism 26, a cover member 99 is mounted to the mount part 12g of the reel body 12a (or the lid member 12d), i.e., the mount part 12g to which the handle 14 is not mounted. Thus, the opened part of the reel body 12a or that of the lid member 12d is covered with the cover member 99. The cover member 99 is fixed to the mount part 12g together with a rotation support portion 64 (to be described) of the rotation control mechanism 26 by three screw members 65 (see FIG. 4).

As shown in FIG. 1, the rotor brake unit 22, the rotation transmission mechanism 24 and an oscillating mechanism 28 are mounted to the interior of the reel body 12a. The oscillating mechanism 28 is a mechanism configured to reciprocate the spool 18 back and forth through the spool shaft 16 in conjunction with the rotation of the handle 14.

Figure 3:
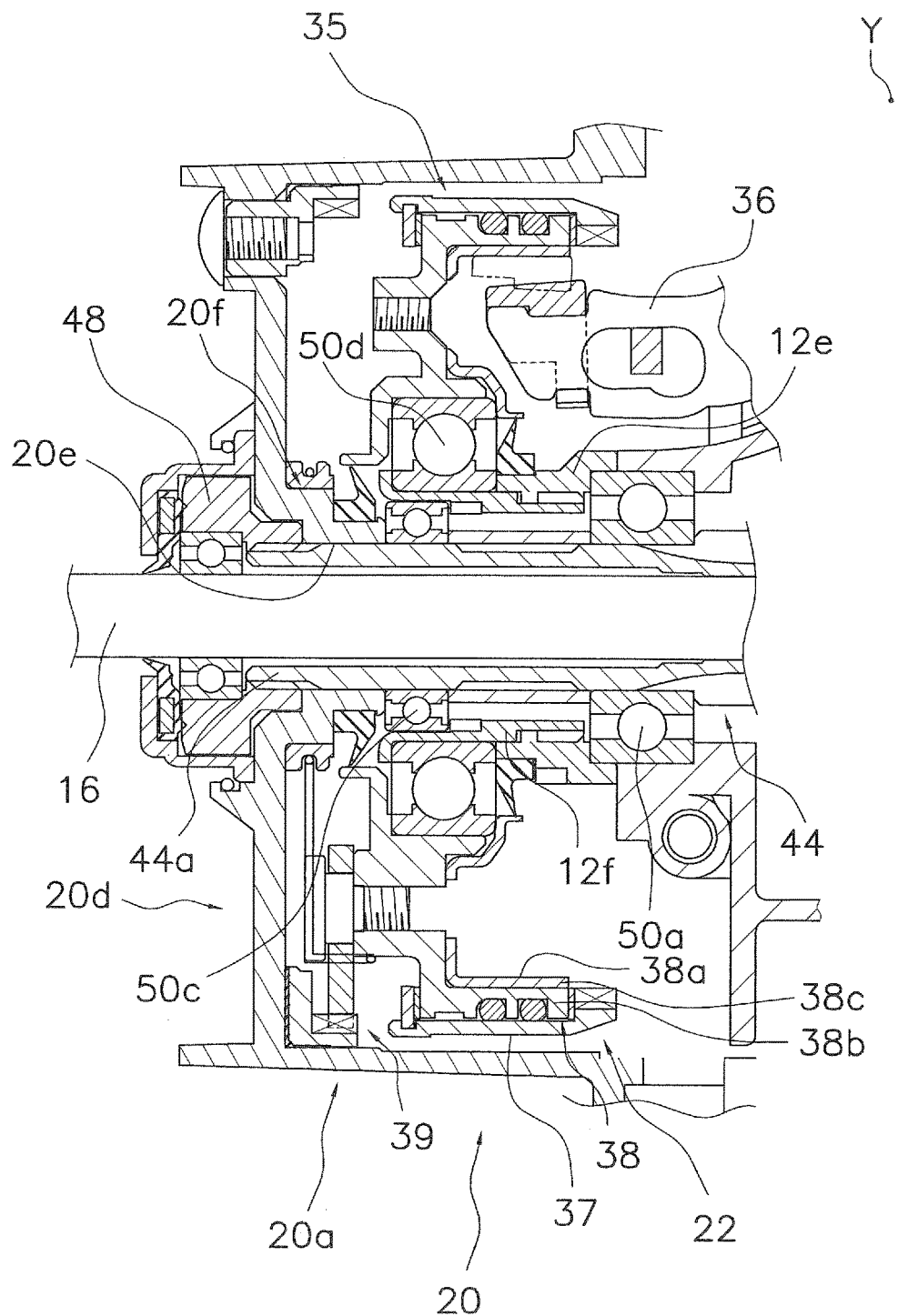
FIG. 3 is an enlarged cross-sectional view of a rotor brake unit shown in FIG. 1.

As shown in FIG. 1, the rotor 20 is rotatably supported by the reel unit 12. The rotor 20 includes a cylindrical part 20a, a first arm 20b and a second arm 20c. The cylindrical part 20a includes a front wall 20d. The first arm 20b and the second arm 20c are disposed laterally to the cylindrical part 20a and are opposed to each other. As shown in FIG. 3, the cylindrical part 20a includes a boss 20f on the center of the front wall 20d thereof. The boss 20f includes a through hole 20e. The spool shaft 16 and a pinion gear 44 (both to be described) penetrate the through hole 20e. The rotor 20 is coupled to and unitarily rotatable with the tip of the pinion gear 44. A bail arm 31 is pivotably mounted to the tip of the first arm 20b and that of the second arm 20c. The fishing line is led to the spool 18 by the bail arm 31.

As shown in FIG. 1, the spool 18 is disposed between the first and second arms 20b and 20c of the rotor 20. The spool 18 is detachably mounted to the tip of the spool shaft 16. The spool 18 includes a spool body 32 and a drag mechanism 34 disposed inside the spool body 32.

<Rotation Transmission Mechanism>

As shown in FIGS. 1, 2 and 3, the rotation transmission mechanism 24 includes a drive shaft 40, a drive gear 42 and the pinion gear 44. The drive shaft 40 is mounted to the reel unit 12 such that the drive shaft 40 is rotatable about an axis arranged skew to the spool shaft 16. The drive shaft 40 includes non-circular coupling shaft parts 40a on the both ends thereof. An inner race 72 to be described can be coupled to and unitarily rotatable with either of the coupling shaft parts 40a. The drive gear 42 is located on and unitarily rotatable with the drive shaft 40. The pinion gear 44 is mounted to and rotatably about the spool shaft 16, and is meshed with the drive gear 42. The rotation of the handle 14 is configured to be transmitted to the drive shaft 40 through the rotation control mechanism 26 only when the rotation of the handle 14 is the fishing-line winding directional rotation. In the first preferred embodiment, the drive shaft 40 has a tubular shape and is integrally formed with the drive gear 42. However, the drive gear 42 can be provided separately from the drive shaft 40. The drive shaft 40 is rotatably supported by the reel body 12a through a bearing 46b (see FIG. 2) and by the lid member 12d through a bearing 46a (see FIG. 2).

The pinion gear 44 has a tubular shape. A front part 44a of the pinion gear 44 penetrates the through hole 20e of the rotor 20 and extends toward the spool 18. The rotor 20 is fixed to and unitarily rotatable with the front part 44a of the pinion gear 44 through a nut 48. The pinion gear 44 is rotatably supported by the reel body 12a at the intermediate part thereof through a bearing 50a and at the rear part thereof through a bearing 50b. Additionally, the pinion gear 44 is rotatably supported at the front part thereof by the attachment member 12e through a bearing 50c.

As shown in FIGS. 1 and 2, the oscillating mechanism 28 is of a traverse cam type. The oscillating mechanism 28 includes an intermediate gear 28a, a helical shaft 28b and a slider 28c. The intermediate gear 28a is meshed with the pinion gear 44. The helical shaft 28b is mounted to the reel body 12a such that the helical shaft 28b is rotatable about an axis arranged in parallel to the spool shaft 16. The slider 28c is configured to be moved back and forth in conjunction with rotation of the helical shaft 28b. The rear end of the spool shaft 16 is attached to the slider 28c, and is non-rotatable and axially immovable.

<Handle>

Figure 5:
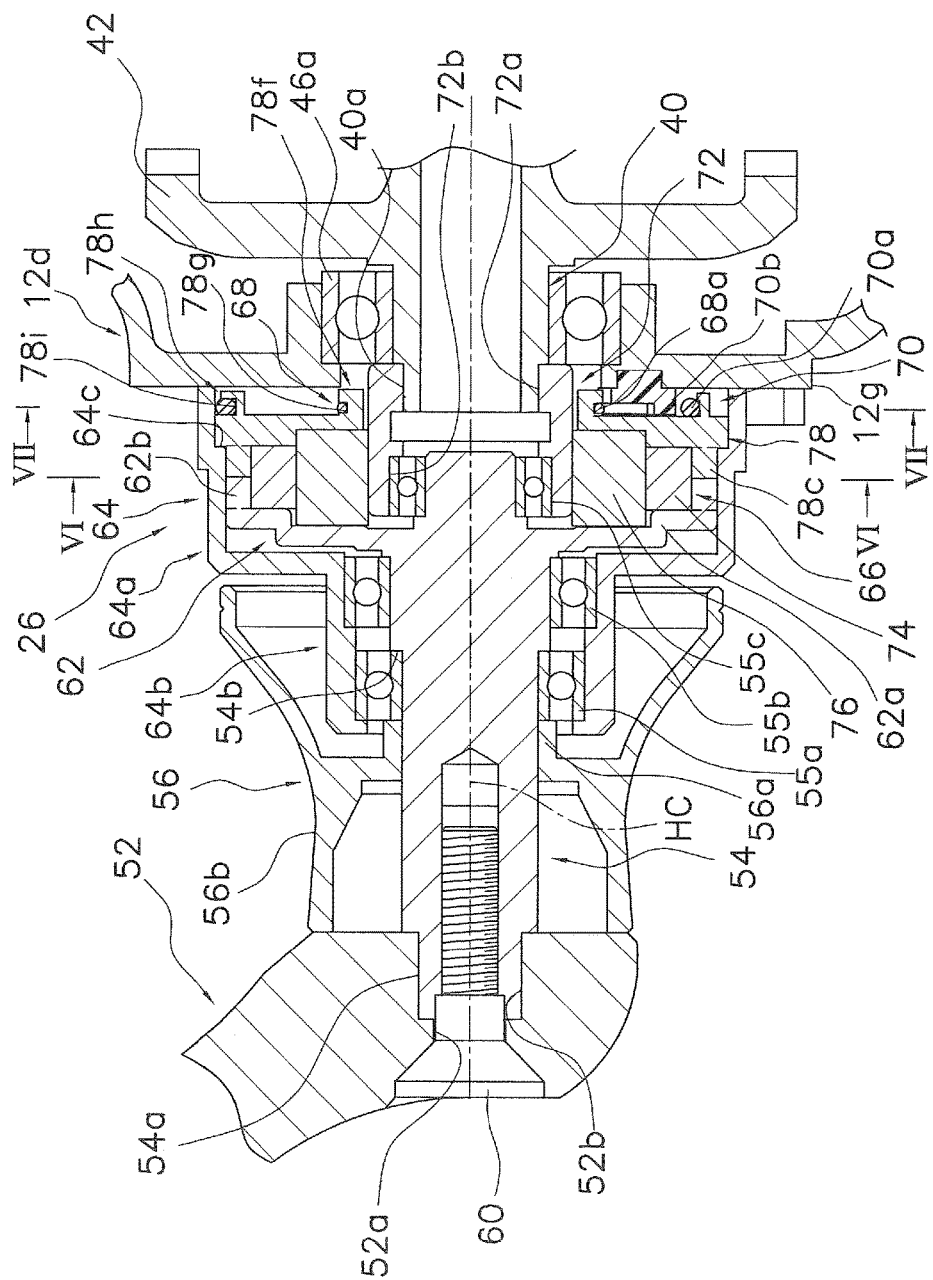
FIG. 5 is an enlarged cross-sectional view of a region including the rotation control mechanism shown in FIG. 2.

As shown in FIG. 2, the handle 14 includes a handle arm 52, a handle shaft 54 and a shaft brim member 56. The handle arm 52 extends in the radial direction of the drive shaft 40. A handle knob 58 is mounted to the tip of the handle arm 52 such that the handle knob 58 is rotatable about an axis arranged in parallel to the drive shaft 40. As shown in FIG. 5, the handle arm 52 includes a through hole 52a and a coupling recess 52b in the base end thereof. The through hole 52a enables a screw member 60 to penetrate therethrough. The coupling recess 52 has a non-circular shape, and enables the handle shaft 54 to be coupled thereto such that the handle shaft 54 is unitarily rotatable therewith. The screw member 60 fixes the handle arm 52 to the handle shaft 54 and simultaneously prevents, through the shaft brim member 56, the rotation support portion 64 of the rotation control mechanism 26 from being detached from the handle shaft 54.

As shown in FIG. 5, the handle shaft 54 is supported by the rotation control mechanism 26 at the lateral part of the reel unit 12 such that the handle shaft 54 is rotatable about the drive shaft 40. The handle shaft 54 is coupled to and unitarily rotatable with the handle arm 52. The handle shaft 54 includes a non-circular part 54a on the tip thereof. The non-circular part 54a is engaged with and unitarily rotatable with the coupling recess 52b. The handle shaft 54 is rotatably supported by the rotation support portion 64 (to be described) of the rotation control mechanism 26 through bearings 55a and 55b. The bearings 55a and 55b are disposed in axial alignment with each other within the rotation support portion 64. The bearing 55a, disposed on the handle arm 52 side, has a smaller inner diameter than the bearing 55b. Therefore, a step 54b is formed on a part of the handle shaft 54 to which the bearing 55a and the bearing 55b are mounted. The handle shaft 54 has a base end having a small diameter, and a bearing 55c is mounted to the base end. The bearing 55c supports the inner race 72 to be described such that the inner race 72 is rotatable.

The shaft brim member 56 is disposed on the outer peripheral side of the handle shaft 54. Axial movement of the shaft brim member 56 is restricted by the handle arm 52. The shaft brim member 56 includes an inner tubular part 56a and an outer tubular part 56b. The inner tubular part 56a is supported by the outer peripheral surface of the handle shaft 54 such that the inner tubular part 56a is rotatable and axially movable. The outer tubular part 56b is integrally formed with the inner tubular part 56a, and flares out such that the diameter thereof increases toward the reel unit 12. The shaft brim member 56 is provided for retaining the rotation control mechanism 26.

<Rotation Control Mechanism>

Figure 4:
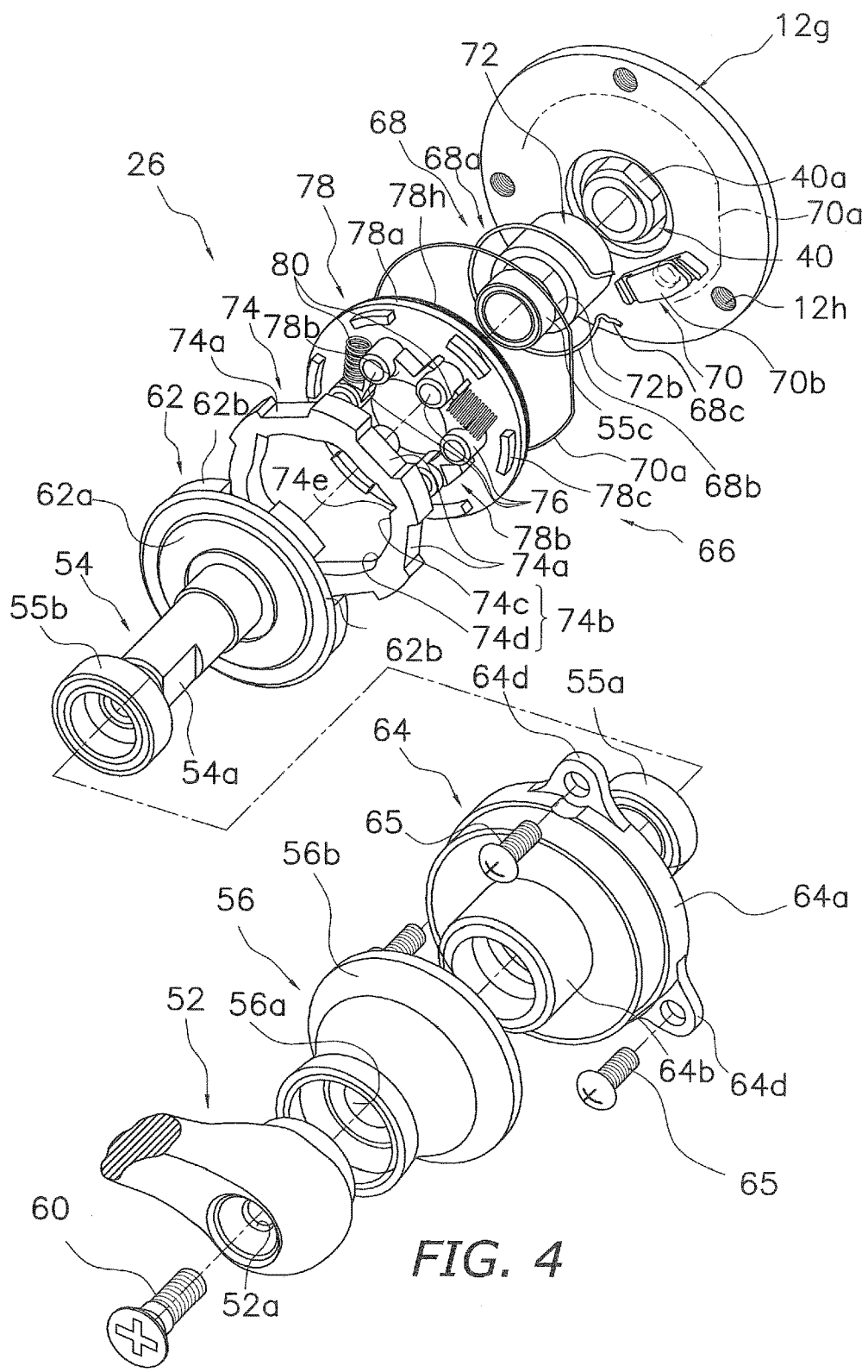
FIG. 4 is a perspective view of a construction of a rotation control mechanism.

As shown in FIG. 2, the rotation control mechanism 26 is mounted between the handle 14 and the drive shaft 40. As shown in FIGS. 4 and 5, the rotation control mechanism 26 includes a coupling portion 62, the rotation support portion 64, a one-way roller clutch 66, a handle brake portion 68 and a handle stopper portion 70.

<Coupling Portion>

The coupling portion 62 is mounted to and unitarily rotatable with one of the drive shaft 40 and the handle shaft 54. The coupling portion 62 is unitarily rotatable with an outer race 74 (to be described) of the one-way roller clutch 66. In the first preferred embodiment, the coupling portion 62 is mounted to and unitarily rotatable with the handle shaft 54. The coupling portion 62 couples the handle shaft 54 and the outer race 74 such that the handle shaft 54 and the outer race 74 are unitarily rotatable. When described in detail, the coupling portion 62 is integrally formed with the handle shaft 54. It should be noted that the coupling portion 62 can be provided separately from the handle shaft 54, and can be coupled to and unitarily rotatable with the handle shaft 54. The coupling portion 62 includes a disc part 62a integrally formed with the handle shaft 54 and at least one first ridge 62b. The disc part 62a is disposed between the bearing 55b and the bearing 55c supporting the inner race 72 to be described. The one or more first ridges 62b protrude from the outer periphery of the disc part 62a in the axial direction of the drive shaft 40, and are engaged with one or more recesses 74a of the outer race 74 to be described. In the present preferred embodiment, a plurality of (e.g., six) first ridges 62b are circumferentially disposed at intervals. The axial protruding length of each first ridge 62b is smaller than the thickness of the outer race 74. In the first preferred embodiment, the axial protruding length of each first ridge 62b is slightly smaller than half the thickness of the outer race 74.

<Rotation Support Portion>

As shown in FIGS. 4 and 5, the rotation support portion 64 is fixed to either the mount part 12g of the reel body 12a or that of the lid member 12d in the reel unit 12. The rotation support portion 64 supports the handle shaft 54 such that the handle shaft 54 is rotatable. The rotation support portion 64 includes an accommodation part 64a and a bearing mount part 64b. The accommodation part 64a has a closed-end tubular shape and accommodates the one-way roller clutch 66. The bearing mount part 64b has a tubular shape and protrudes from the inner periphery of the accommodation part 64a. A slight step 64c for positioning (see FIG. 5) is formed on the inner peripheral surface of the accommodation part 64a. A plurality of (e.g., three) chevron-shaped fixation tabs 64d (see FIG. 4) are formed on the lid member 12d-side region of the outer peripheral surface of the accommodation part 64a. The fixation tabs 64d are circumferentially disposed at intervals and extend radially outward. The rotation support portion 64 is fixed to either the lid member 12d or the reel body 12a by the three screw members 65, which are screwed into screw holes 12h of the mount part 12g while penetrating the fixation tabs 64d. The bearing 55a and the bearing 55b are mounted to the inner peripheral surface of the bearing mount part 64b, while being axially positioned.

<One-Way Roller Clutch>

Figure 6:
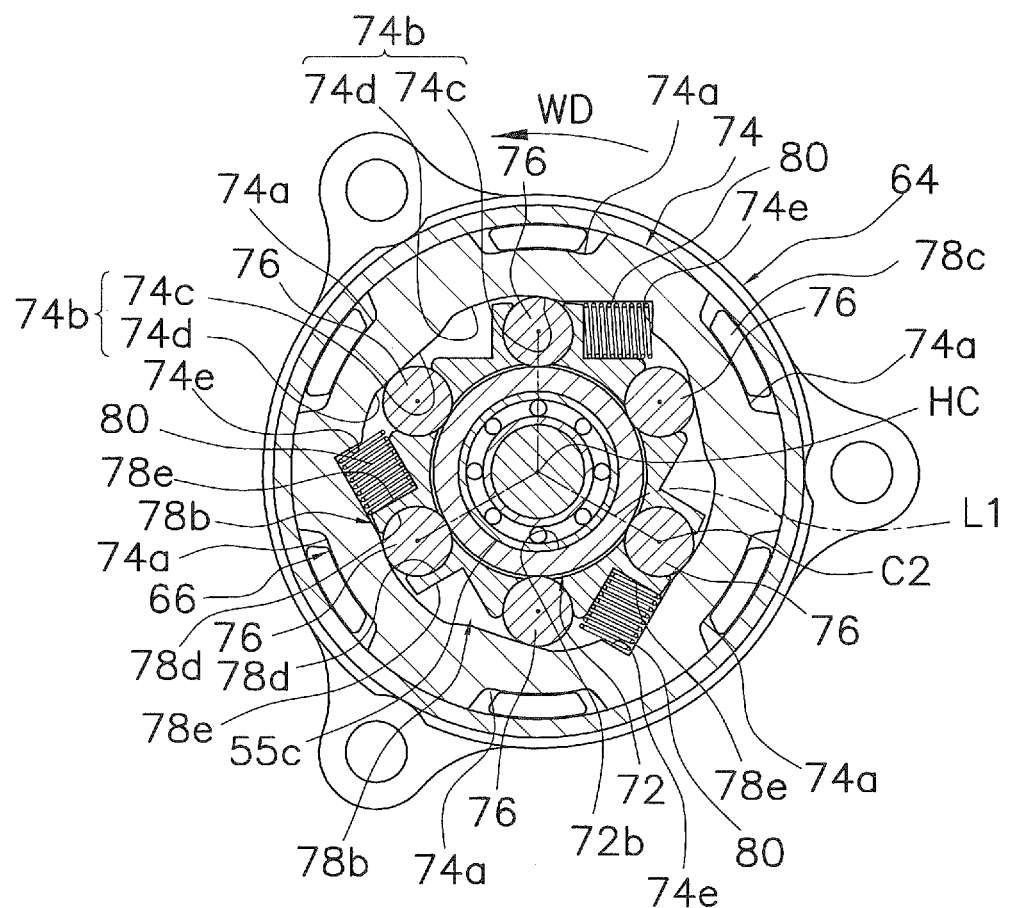
FIG. 6 is a cross-sectional view of FIG. 5 taken along line VI-VI.

As shown in FIGS. 4 to 6, the one-way roller clutch 66 is configured to transmit the rotation of the handle 14 to the drive shaft 40 only when the rotational direction of the handle 14 is a fishing-line winding direction WD (see FIG. 6). The one-way roller clutch 66 is accommodated in the rotation support portion 64. The one-way roller clutch 66 includes the inner race 72, the outer race 74, a plurality of (e.g., six) rollers 76, a holding member 78 (see FIGS. 4 and 5) and at least one urging member 80. The number of the urging members 80 can be equal to that of the rollers 76, or alternatively, can be less than that of the rollers 76. In the present preferred embodiment, the one or more urging members 80 are, for instance, coil springs. The number of the urging members 80 is half the number of the rollers 76 (e.g., three).

Figure 7:
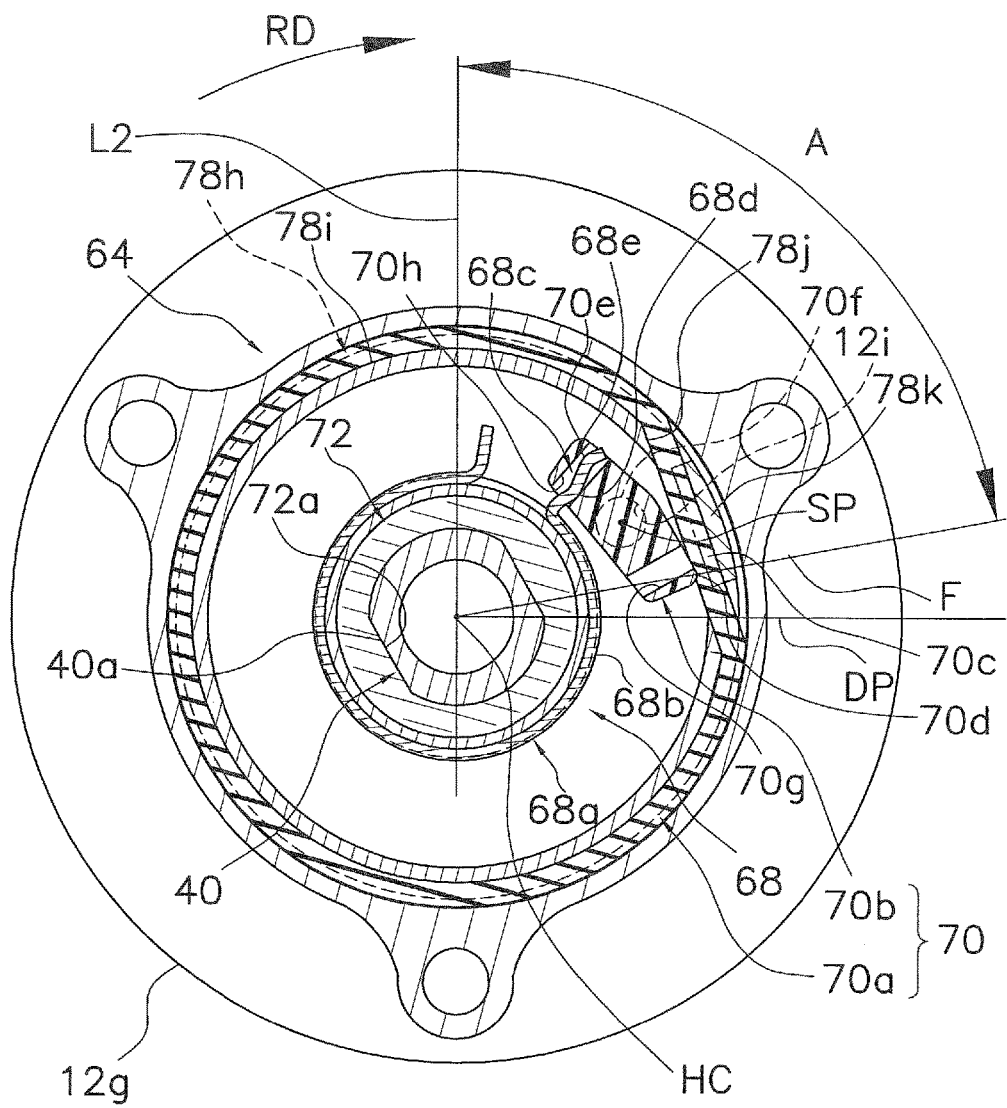
FIG. 7 is a cross-sectional view of FIG. 5 taken along line VII-VII.

The inner race 72 is a cylindrical roller member made of metal. The inner race 72 is mounted to and unitarily rotatable with one of the drive shaft 40 and the handle 14. In the first preferred embodiment, the inner race 72 is mounted to and unitarily rotatable with the drive shaft 40. As shown in FIGS. 5 and 7, the inner race 72 includes a non-circular coupling hole part 72a in the drive shaft 40-side end thereof (hereinafter referred to as "first end"). The coupling hole part 72a is coupled onto and unitarily rotatable with one of the coupling shaft parts 40a formed on the both ends of the drive shaft 40. As shown in FIGS. 5 and 6, the inner race 72 includes a mount hole part 72b in the handle shaft 54-side end thereof (hereinafter referred to as "second end"). The bearing 55c is mountable to the mount hole part 72b. The inner race 72 is rotatably supported by the handle shaft 54 through the bearing 55c.

As shown in FIGS. 4 and 6, the outer race 74 is a roughly ring-shaped member made of metal. The outer race 74 includes a plurality of recesses 74a on the outer peripheral surface thereof. The recesses 74a are circumferentially aligned at intervals. As shown in FIG. 6, the outer race 74 includes a plurality of (e.g., six) cam surfaces 74b and a plurality of spring engaging parts 74e on the inner peripheral surface thereof. Each cam surface 74b includes a pair of a stuck part 74c and an unstuck part 74d. The stuck parts 74c are circumferentially aligned at intervals, and likewise, the unstuck parts 74d are circumferentially aligned at intervals. On the stuck parts 74c, the rollers 76 can get stuck between the inner race 72 and the outer race 74. On the unstuck parts 74d, the rollers 76 are disposed between the inner race 72 and the outer race 74 through a gap. It should be noted that in FIG. 6, reference signs are assigned to two pairs of the stuck part 74c and the unstuck part 74d without being assigned to the other four pairs of the stuck part 74c and the unstuck part 74d. Each spring engaging part 74e is engaged with one end of each urging member 80 made in the form of a coil spring. A plurality of (e.g., three) spring engaging parts 74e are disposed on the stuck part 74c side of every other cam surface 74b.

The plural rollers 76 are disposed between the inner race 72 and the outer race 74, and are circumferentially aligned at intervals. The plural rollers 76 are circumferentially movable to transmission allowed positions and transmission prevented positions. A rotation is transmitted when the rollers 76 are located in the transmission allowed positions, whereas the rotation is not transmitted when the rollers 76 are located in the transmission prevented positions. Here, the transmission allowed positions are positions in which the rollers 76 are contacted to the stuck parts 74c of the cam surfaces 74b. The transmission prevented positions are positions in which the rollers 76 are faced to the unstuck parts 74d of the cam surfaces 74b.

The holding member 78 is a member on which the rollers 76 are circumferentially disposed at intervals. The holding member 78 is rotatably mounted to the inner peripheral surface of the accommodation part 64a of the rotation support portion 64. The holding member 78 includes a disc-shaped body 78a enabling the inner race 72 to pass through the center thereof, a plurality of (e.g., six) holding parts 78b, and a plurality of (e.g., six) second ridges 78c. The body 78a is axially positioned at the outer peripheral part thereof by the step 64c of the rotation support portion 64. The plural holding parts 78b are disposed on the handle 14-side surface of the body 78a, and are circumferentially aligned at intervals. The plural second ridges 78c are disposed on the outer peripheral part of the body 78a at an interval from the outer peripheral surface of the body 78a, and are circumferentially aligned at intervals.

Figure 8:
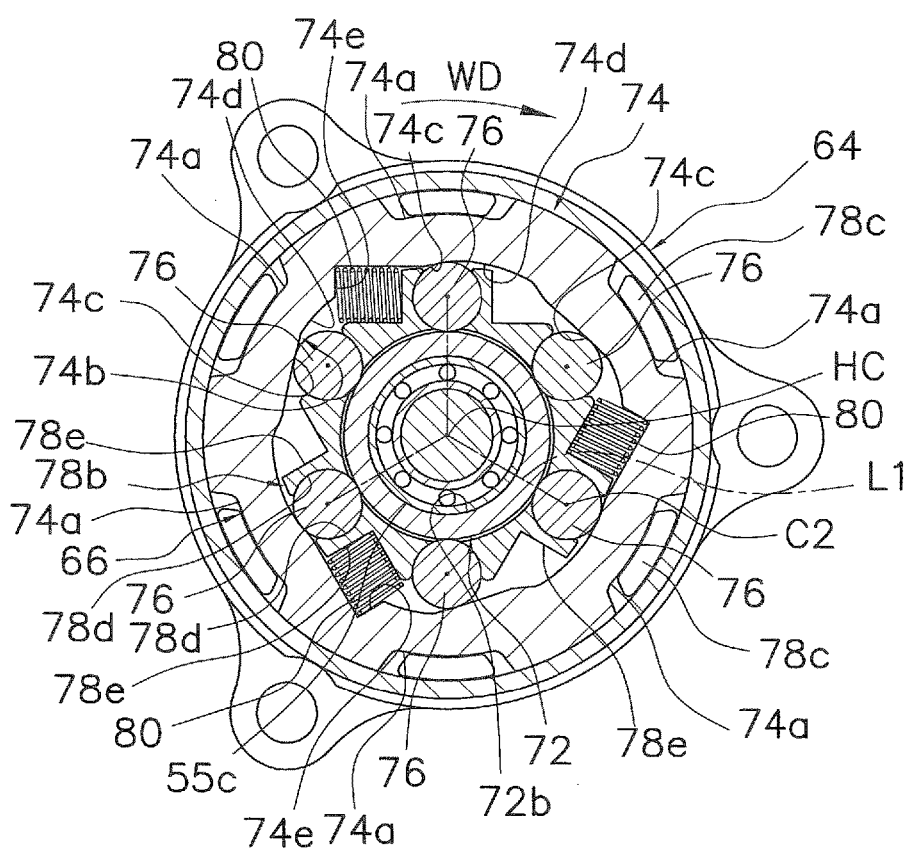
FIG. 8 is a cross-sectional view corresponding to FIG. 6 and shows a condition that a one-way roller clutch is rearranged for installation in a right handle spinning reel.

The plural holding parts 78b protrude toward the handle 14. Each holding part 78b includes a pair of first surfaces 78d and a second surface 78e. Each first surface 78d is a curved surface and can be engaged with the outer peripheral surface of each roller 76. The second surface 78e can be engaged with one end of each urging member 80. As shown in FIG. 6, the plural holding parts 78b are disposed such that an adjacent two of them are disposed symmetrically to each other with respect to first straight line L1. The first straight line L1 connects the center (C2) of the roller 76 urged by each urging member 80 and the rotational center (HC) of the one-way roller clutch 66. When the spinning reel 10 is of a right handle type that the handle 14 is mounted to the right side of the reel body 12 in a rear-side view, it is only required in the holding member 78 to reverse the front-back orientation of the outer race 74 and to dispose each urging member 80 on the second surface 78e on the circumferentially opposite side of the aforementioned second surface 78e on which each urging member 80 is originally disposed in the spinning reel 10 of the left handle type through each roller 76. This condition is shown in FIG. 8. In FIG. 8, the fishing-line winding direction WD becomes the clockwise direction. With the construction described above, the rotation control mechanism 26 including the one-way roller clutch 66 can be commonly used in both the left handle type spinning reel 10 and the right handle type spinning reel 10, and the number of components can be reduced.

The holding parts 78b hold the rollers 76 such that the rollers 76 are circumferentially disposed at intervals. The second ridges 78c protrude from the surface of the outer peripheral part of the body 78a in the axial direction of the drive shaft 40 so as to be engaged with the plural recesses 74a. Each second ridge 78c has a shorter circumferential length than each recess 74a. Therefore, when the second ridges 78c are engaged with the recesses 74a, gaps are formed on circumferentially both sides of each second ridge 78c. Each second ridge 78c has an axial protruding length shorter than the thickness of the outer race 74. In the first preferred embodiment, the axial protruding length of each second ridge 78c is slightly shorter than half the thickness of the outer race 74. Accordingly, the first ridges 62b and the second ridges 78c can be positioned in the same circumferential positions within the recesses 74a of the outer race 74.

As shown in FIG. 5, the body 78a includes a first protruding part 78f in the inner peripheral part thereof. The first protruding part 78f annularly protrudes toward the mount part 12g. The first protruding part 78f includes a first annular groove 78g on the outer peripheral surface thereof. The handle brake portion 68 is fitted to the first annular groove 78g. The first annular groove 78g is roughly annularly recessed on the first protruding part 78f, and is opened to the outer peripheral side. As shown in FIG. 5, the body 78a includes a second protruding part 78h on the outer peripheral part thereof. The second protruding part 78h annularly protrudes toward the mount part 12g. The second protruding part 78h includes a second annular groove 78i on the outer peripheral surface thereof. The handle stopper portion 70 is fitted to the second annular groove 78i. The second annular groove 78i is roughly annularly recessed on the second protruding part 78h, and is opened to the outer peripheral side. The second annular groove 78i includes a cutout 78j formed by straightly cutting a circumferential part thereof. The cutout 78j is formed in association with a predetermined rotational phase F to be described. A restriction protrusion 78k is formed on the radial outside of the cutout 78j, and restricts an annular member 70a to be described from moving radially outward.

<Handle Brake Portion>

As shown in FIGS. 4, 5 and 7, the handle brake portion 68 is configured to apply a braking force to a rotation of the handle 14 when the rotational direction of the handle 14 is a reverse direction RD relative to the fishing-line winding direction WD. The handle brake portion 68 is an example of handle braking means. For example, chances are that the handle 14 is rotated in the reverse direction RD (clockwise direction in FIG. 7) relative to the fishing-line winding direction WD due to slight friction of the one-way roller clutch 66 or so forth. To prevent this, the handle brake portion 68 is provided.

The handle brake portion 68 is constructed by a spring member 68a made of an elastic metal spring wire rod. As shown in FIGS. 4 and 7, the spring member 68a includes a curved part 68b and a spring hook part 68c. The curved part 68b is mounted to the first annular groove 78g, and can be frictionally engaged therewith. The curved part 68b curves in the counterclockwise direction in FIG. 4 and then continues to the spring hook part 68c. The spring hook part 68c bends at one end of the curved part 68b radially outward and then bends in a flat S shape. The spring hook part 68c is hooked to a stopper member 70b (to be described) of the handle stopper portion 70, and is slightly movable in the circumferential direction. The spring hook part 68c includes a first pressing part 68d and a second pressing part 68e. The first pressing part 68d is configured to press the stopper member 70b when the handle 14 is rotated in the reverse direction RD relative to the fishing-line winding direction WD. On the other hand, the second pressing part 68e is configured to press the stopper member 70b when the handle 14 is rotated in the fishing-line winding direction WD. Accordingly, the spring member 68a is configured to urge the stopper member 70b to be described in different directions in accordance with the rotational direction of the handle 14. It should be noted that the spring hook part 68c can have a straight shape, whereas each of first and second engaging parts (to be described) can have a flat S shape and can include first and second pressed parts to be pressed by the spring hook part 68c.

In the handle brake portion 68 thus constructed, when the handle 14 is rotated in the reverse direction RD relative to the fishing-line winding direction WD, the diameter of the curved part 68b decreases and the spring member 68a is fastened. Thus, the spring member 68a is frictionally engaged with the first annular groove 78g, and rotational resistance increases. Accordingly, the handle 14 is braked. Contrarily, when the handle 14 is rotated in the fishing-line winding direction WD, the diameter of the curved part 68b increases and the spring member 68a is loosened. Thus, rotational resistance decreases, and therefore, the handle 14 is not braked.

<Handle Stopper Portion>

As shown in FIG. 7, the handle stopper portion 70 is configured to stop the rotation of the handle 14 at the predetermined rotational phase F only when the handle 14 is rotated in the reverse direction RD relative to the fishing-line winding direction WD. The handle stopper portion 70 is an example of a handle stopper means. When the fishing rod is raised upright, the predetermined rotational phase F is located nearer to the fishing rod side than a rotational phase DP corresponding to the bottom dead center of the handle 14. In FIG. 7, an angle A is formed by the predetermined rotational phase F and second straight line L2 arranged in parallel to the spool shaft 16, both of which intersect at the rotational center HC of the handle shaft 54. For example, the angle A is in a range of 40 to 140 degrees. In the first preferred embodiment, as shown in FIG. 7, the angle A is set to be, for instance, roughly 70 degrees.

The handle stopper portion 70 includes the annular member 70a having elasticity and the stopper member 70b. The annular member 70a is mounted to the second annular groove 78i such that the annular member 70a slightly generates a tension. For example, the annular member 70a is an O-ring made of synthetic rubber.

When the annular member 70a is mounted to the second annular groove 78i, a part of the annular member 70a is straightly disposed in the cutout 78j. Therefore, when the annular member 70a is mounted to the second annular groove 78i, a straight part 70c is formed therein and accordingly the annular member 70a is entirely disposed in a D shape. The straight part 70c is restricted from moving radially outward by the restriction protrusion 78k.

The stopper member 70b is, for instance, a plate-shaped member made of a synthetic resin. The stopper member 70b is pivotably mounted to the mount part 12g in correspondence with the predetermined rotational phase F. The stopper member 70b pivots between a contact position and a remote position. In the contact position, the stopper member 70b is contactable to the straight part 70c. In the remote position, the stopper member 70b is separated from the straight part 70c. The stopper member 70b is contacted to the annular member 70a at and after a phase nearer to the fishing rod than the predetermined rotational phase F, and compresses the annular member 70a. The handle 14 is thereby stopped.

The stopper member 70b is a flat pentagonal member, and includes a first corner 70d and a second corner 70e. The first and second corners 70d and 70e are rounded corners formed on both circumferential ends of the stopper member 70b. When the spinning reel 10 is of the left handle type, the stopper member 70b is disposed slant to the straight part 70c such that the first corner 70d is disposed closer to the straight part 70c than the second corner 70e. The stopper member 70b is caused to pivot between the contact position and the remote position by the spring member 68a.

A pivot shaft 70f is disposed on the circumferential center of the mount part 12g-side surface of the stopper member 70b, and is engaged with the mount part 12g. The pivot shaft 70f is pivotably supported by a support part 12i disposed on the mount part 12g. The stopper member 70b includes a first engaging part 70g on the pivot shaft 70f side of the first corner 70d, and the spring hook part 68c of the spring member 68a is configured to be engaged with the first engaging part 70g. The stopper member 70b includes a second engaging part 70h on the pivot shaft 70f side of the second corner 70e, and the spring hook part 68c of the spring member 68a is configured to be engaged with the second engaging part 70h. Each of the first and second engaging parts 70g and 70h is made in the form of a groove to which the first and second pressing parts 68d and 68e of the spring hook part 68c are contactable. When engaged with the first engaging part 70g, the spring hook part 68c is oriented such that the first pressing part 68d thereof is contacted to the pivot shaft 70f-side wall surface of the first engaging part 70g. In the condition that the spring member 68a is mounted to the first annular groove 78g, the radial position of the first pressing part 68d from the rotational center HC is located radially inside the radial position of a center SP of the pivot shaft 70f from the rotational center HC. Additionally, the radial position of the second pressing part 68e from the rotational center HC is located radially outside that of the center SP of the pivot shaft 70f from the rotational center HC. The first engaging part 70g and the second engaging part 70h are formed on the surface of the stopper member 70b in opposition to the holding member 78. When the spinning reel 10 is of the left handle type, the first corner 70d, disposed closer to the straight part 70c than the second corner 70e, can be press-contacted to the straight part 70c. Additionally, the spring hook part 68c is engaged with the second engaging part 70h. Contrarily, when the spinning reel 10 is of the right handle type, the second corner 70e is disposed closer to the straight part 70c than the first corner 70d, and can be press-contacted to the straight part 70c. Additionally, the spring hook part 68c is engaged with the first engaging part 70g.

In the handle stopper portion 70 thus constructed, when the handle 14 is rotated in the reverse direction RD relative to the fishing-line winding direction WD, the first pressing part 68d of the spring hook part 68c presses the pivot shaft 70f-side wall surface of the second engaging part 70h, and urges the stopper member 70b in the counterclockwise direction of FIG. 7. Accordingly, the stopper member 70b pivots to the contact position, and the first corner 70d presses the straight part 70c of the annular member 70a. The handle 14 is thereby stopped rotating. Contrarily, when the handle 14 is rotated in the fishing-line winding direction WD, the second pressing part 68e of the spring hook part 68c presses the second corner 70e-side wall surface of the second engaging part 70h, and urges the stopper member 70b in the clockwise direction of FIG. 7. Accordingly, the stopper member 70b pivots to the remote position, and the first corner 70d is separated from the straight part 70c of the annular member 70a. The handle 14 is thereby allowed to freely rotate without rotating being stopped.

<Rotor Brake Unit>

As shown in FIGS. 1 and 3, the rotor brake unit 22 includes a brake portion 35, a brake lever 36 and a predetermined-braking-force switcher 37. The brake lever 36 is operated for regulating the braking force of the brake portion 35. The predetermined-braking-force switcher 37 is configured to switch between braking with a predetermined force and unbraking in accordance with an operation of the brake lever 36.

The brake portion 35 includes a brake-portion body 38 and a one-way clutch 39. The brake-portion body 38 includes a brake surface 38a, and is configured to be braked when the tip of the brake lever 36 is press-contacted to the brake surface 38a. The one-way clutch 39 is configured to couple/decouple the rotor 20 and the brake-portion body 38 to/from each other in accordance with the rotational direction of the rotor 20.

The brake-portion body 38 includes a tubular member 38b and a brake cylinder 38c. The tubular member 38b is disposed concentrically to the rotor 20 on the inner peripheral side of the cylindrical part 20a of the rotor 20. The brake cylinder 38c is fixed to the inner peripheral surface of the tubular member 38b.

The tubular member 38b is rotatably supported by a bearing retainer ring 12f through a bearing 50d. The bearing retainer ring 12f is screwed and fixed into the attachment member 12e of the reel unit 12.

The one-way clutch 39 is of a pawl type. Only when the rotor 20 is rotated in the fishing-line releasing direction, the one-way clutch 39 is configured to couple the rotor 20 and the tubular member 38b of the brake-portion body 38 and rotate the tubular member 38b in the fishing-line releasing direction in conjunction with a rotation of the rotor 20. In other words, the fishing-line winding directional rotation of the rotor 20 is configured not to be transmitted to the tubular member 38b.

When the rotor 20 is rotated in the fishing-line releasing direction, the one-way clutch 39 is configured to be engaged, and the rotation of the rotor 20 is configured to be transmitted to the tubular member 38b and a brake operation by the rotor brake unit 22 is enabled.

As shown in FIG. 1, the brake lever 36 is supported by the reel unit 12 such that the brake lever 36 is pivotable about a second axis Y arranged skew to the first axis X. The brake lever 36 is urged in an opposite direction to the fishing rod attachment 12c.

The brake lever 36 is attached to the reel unit 12 such that the brake lever 36 is pivotable between a predetermined braking position depicted with broken line in FIG. 1 and a braking position depicted with dashed two-dotted line in FIG. 1. The braking position is located closer to the fishing rod attachment 12c than an unbraking position. It should be noted that the brake lever 36 is configured to be normally held in either the unbraking position depicted with solid line in FIG. 1 or the predetermined braking position depicted with broken line in FIG. 1.

<Action of Spinning Reel>

In carrying out fishing, the bail arm 31 is flipped down to a fishing-line releasing position. When the fishing rod is cast under that condition, the fishing line is reeled out of the outer periphery of the spool 18. In winding the fishing line, the handle 14 is rotated in the fishing-line winding direction. Accordingly, the bail arm 31 is returned to a fishing-line winding position by a return mechanism (not shown in the drawings). The rotational force of the handle 14 is transmitted to the outer race 74 through the coupling portion 62 almost without play. When the outer race 74 is rotated, the rotation of the outer race 74 is transmitted to the holding member 78. At this time, the timing of transmitting rotation is delayed by the gaps between the recesses 74a and the second ridges 78c. As a result, the holding member 78 is rotated in a condition that the rollers 76 get stuck with the stuck parts 74c, and the one-way roller clutch 66 is reliably engaged. When the one-way roller clutch 66 is engaged, the rotation of the handle 14 is transmitted to the pinion gear 44 through the drive shaft 40 and the drive gear 42. The rotational force, transmitted to the pinion gear 44, is transmitted to the rotor 20 through the front part 44a of the pinion gear 44. At this time, the rotor 20 is rotated in the fishing-line winding direction. Hence, the one-way clutch 39 is not actuated, and the rotational force of the rotor 20 is not transmitted to the tubular member 38b. When the pinion gear 44 is rotated, the spool shaft 16 is reciprocated in the back-and-forth direction.

When not operated at all, the brake lever 36 is pressed by the action of the predetermined-braking-force switcher 37, and is disposed in either the unbraking position or the predetermined braking position.

In dealing with movement of hooked fish by rotating the rotor 20 in the fishing-line releasing direction, a braking force is regulated by an operation of pulling the brake lever 36 toward the fishing rod attachment 12c.

At this time, the fishing-line releasing directional rotation of the rotor 20 is transmitted to the drive shaft 40 through the pinion gear 44 and the drive gear 42. However, in the first preferred embodiment, the rotation control mechanism 26 includes the one-way roller clutch 66 configured to transmit the rotation of the handle 14 to the drive shaft 40 only when the rotation of the handle 14 is the fishing-line winding directional rotation. Therefore, even when the drive shaft 40 is reversely rotated, the one-way roller clutch 66 is instantly disengaged. Accordingly, the handle 14 can be instantly prevented from rotating in the reverse direction RD relative to the fishing-line winding direction WD.

Incidentally, chances are that when the handle 14 is released from an angler's hand, the handle 14 is rotated in the reverse direction RD relative to the fishing-line winding direction WD. However, at this time, the curved part 68b of the spring member 68a of the handle brake portion 68 is tightened, and this brakes the rotation of the handle 14. Moreover, the handle stopper portion 70 stops the rotation of the handle 14 at the predetermined rotational phase F.

When the handle 14 is moved from its mount position in the spinning reel 10 of the left handle type shown in FIG. 2 to that in the spinning reel 10 of the right handle type shown in FIG. 9, the rotation support portion 64 is detached from the mount part 12g of the lid member 12d. Additionally, the spring member 68a of the handle brake portion 68 is detached from the first annular groove 78g of the holding member 78. Moreover, the stopper member 70b is detached from the mount part 12g of the lid member 12d. The front-back orientation of the detached spring member 68a is reversed, and is again attached to the first annular groove 78g of the holding member 78. Then, the holding member 78 and the urging members 80 are detached from the rotation support portion 64, and as described above, the outer race 74 is attached to the rotation support portion 64 in the condition that its front-back orientation shown in FIG. 6 is reversed. Next, the holding member 78 is restored to the rotation support portion 64, and each urging member 80 is disposed on the opposite side of its original position in the construction for the left handle type through each roller 76. Accordingly, the one-way roller clutch 66 is changed into the condition shown in FIG. 8. Under the condition, the cover member 99 is detached from the mount part 12g of the reel body 12a, and the detached stopper member 70b is again mounted to the support part 12i of the mount part 12g of the reel body 12a. In mounting the stopper member 70b, the spring hook part 68c of the spring member 68a is engaged with the first engaging part 70g of the stopper member 70b. Under that condition, the rotation support portion 64 is fixed to the mount part 12g of the reel body 12a by the screw members 65. Accordingly, the spinning reel 10 of the right handle type shown in FIG. 9 is implemented, with reverse handle rotation being prevented.

Finally, the cover member 99 is fixed to the mount part 12g of the lid member 12d. With that construction, the rotation control mechanism 26 can be commonly used between the spinning reel 10 of the left handle type and that of the right handle type without manufacturing members for the spinning reel 10 of the right handle type.

Incidentally, in changing the configuration of preventing reverse rotation of the handle 14 into a configuration of allowing it, the rotation control mechanism 26 is detached by detaching the rotation support portion 64 from the mount part 12g. Then, it is only required to prepare a handle shaft directly engageable with the coupling shaft part 40a of the drive shaft 40. In this case, the rotation support portion 64 can be constructed to support the handle shaft herein prepared.

Second Preferred Embodiment

In a spinning reel 110 according to a second preferred embodiment shown in FIGS. 10 to 14, constituent elements, mainly including a reel unit 112, a rotation transmission path from a handle 114 to a drive shaft 140, a handle brake portion 168 and a handle stopper portion 170, are constructed differently from their corresponding ones of the spinning reel 10 according to the first preferred embodiment. It should be noted that in the second preferred embodiment, these constituent elements constructed differently from their corresponding ones in the first preferred embodiment will be explained. Additionally, when a given constituent element in the second preferred embodiment has the same construction as its corresponding one in the first preferred embodiment, a reference sign assigned to the corresponding one will be similarly assigned to the given constituent element. In the second preferred embodiment, a three-digit reference sign will be assigned to a given constituent element that has the same function as its corresponding one in the first preferred embodiment but is constructed differently from the corresponding one. Here, the last two digits of the three-digit reference sign correspond to a two-digit reference sign assigned to the corresponding one in the first preferred embodiment.

<Reel Unit>

Figure 11:
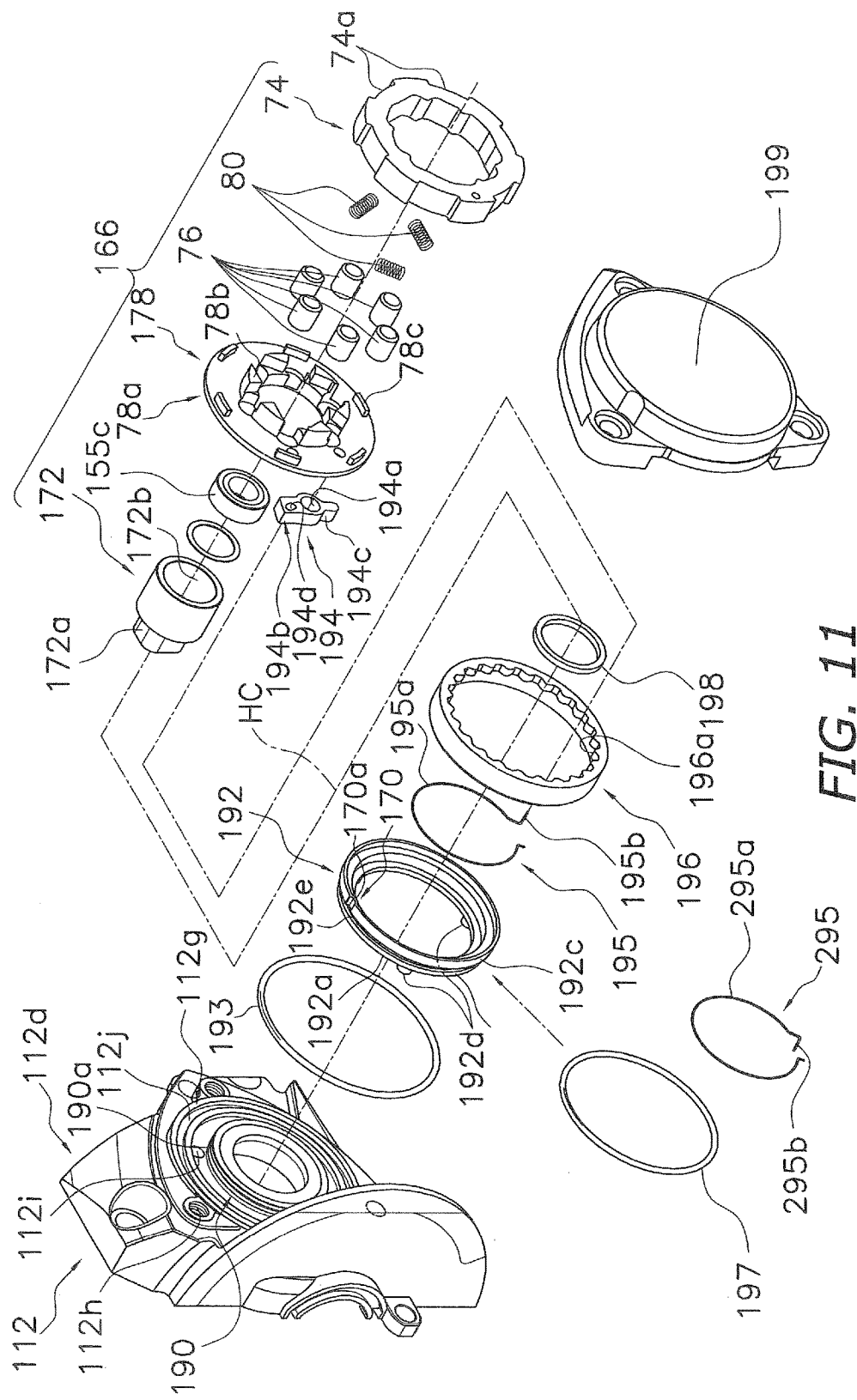
FIG. 11 is an exploded perspective view of the spinning reel according to the second preferred embodiment and shows the remaining constituent elements of the rotation control mechanism.
Figure 12:
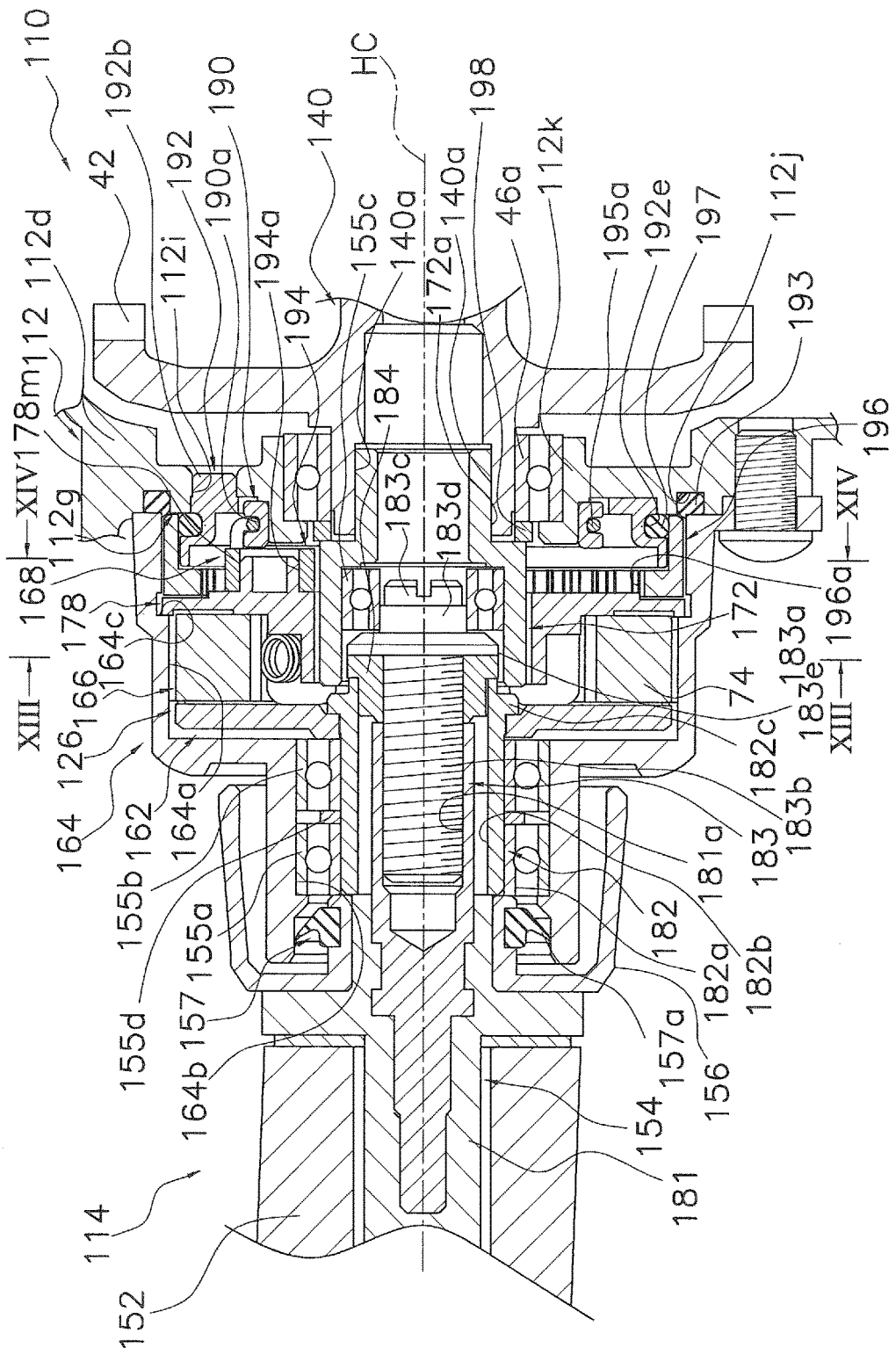
FIG. 12 is an enlarged cross-sectional view of the spinning reel according to the second preferred embodiment and corresponds to FIG. 5.

As shown in FIGS. 11 and 12, each of a lid member 112d and a reel body (not shown in the drawings) of the reel unit 112 includes, e.g., a circular mount part 112g on the outer surface thereof. The circular mount part 112g is a part to which a rotation control mechanism 126 of the second preferred embodiment is mountable. The mount part 112g of the reel body is covered with a cover member 199 shown in FIG. 11. Similarly to the first preferred embodiment, the cover member 199 is fixed by screw members having the same constructions as screw members 165 for fixing a rotation support portion 164 to be described. The reel unit 112 includes an annular spring holding member 190. The spring holding member 190 includes a first annular groove 190a. A spring member 195, forming the handle brake portion 168 of the second preferred embodiment, is frictionally engaged at its curved part 195a with the first annular groove 190a. The spring holding member 190 is detachably and non-rotatably mounted to either the outer peripheral surface of a tubular part 112k outwardly protruding from the lid member 112d to attach the bearing 46a thereto or the outer peripheral surface of a tubular part protruding from the reel body (not shown in the drawings) to attach the bearing 46b thereto.

The reel unit 112 includes an annular member 192. The annular member 192 is disposed on the outer peripheral side of the spring holding member 190. An elastic ring 197, forming the handle brake portion 168 of the second preferred embodiment, is mountable to the outer peripheral surface of the annular member 192. The annular member 192 is formed by, for instance, stamping of a tubular member made of metal. The annular member 192 is detachably and non-rotatably mounted to the mount part 112g. As shown in FIG. 11, the annular member 192 is a stepped tubular member made of metal, and includes a washer-shaped attachment part 192a, a small diameter part 192b and a large diameter part 192c. The small diameter part 192b is formed on the outer peripheral side of the attachment part 192a. The large diameter part 192c continues to the small diameter part 192b, and has a larger diameter than the small diameter part 192b. A plurality of (e.g., three) attachment protrusions 192d are formed on the attachment part 192a. The attachment protrusions 192d are fitted into a plurality of (e.g., three) attachment holes 112i. The attachment holes 112i are bored in the mount part 112g, and are circumferentially aligned at intervals. The small diameter part 192b includes a second annular groove 192e on the outer peripheral surface thereof. The elastic ring 197 is mountable to the second annular groove 192e. The elastic ring 197 is, for instance, an O-ring. The large diameter part 192c has a protruding part 170a that forms the handle stopper portion 170. The protruding part 170a protrudes in a chevron shape to the inner peripheral side.

The mount part 112g includes an annular seal groove 112j. The seal groove 112j is disposed on the outer peripheral side of the spring holding member 190. A first seal member 193 is mounted to the seal groove 112j. The first seal member 193 seals a gap between the mount part 112g and the rotation support portion 164 of the second preferred embodiment. The first seal member 193 is, for instance, an O-ring.

<Handle>

Figure 10:
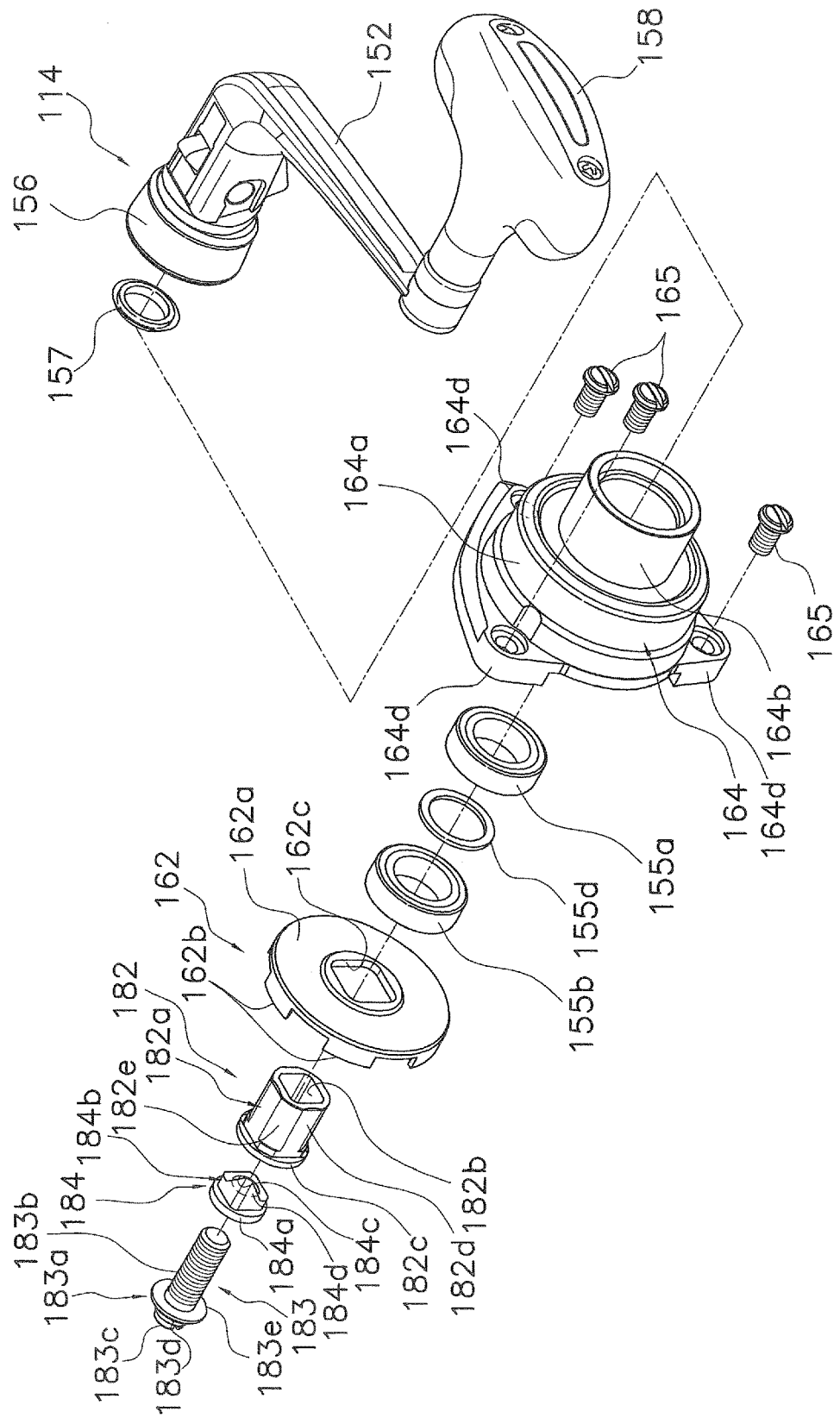
FIG. 10 is an exploded perspective view of a spinning reel according to a second preferred embodiment and shows a handle and some constituent elements of a rotation control mechanism.

As shown in FIG. 10, the handle 114 includes a handle arm 152, a handle shaft 154 (see FIG. 12) and a shaft brim member 156. The handle arm 152 extends in the radial direction of the drive shaft 140. A handle knob 158, having the same shape as the handle knob 58 of the first preferred embodiment, is mounted to the tip of the handle arm 152 such that the handle knob 158 is rotatable about an axis arranged in parallel to the drive shaft 140. The handle arm 152 is different from the handle arm 52 of the first preferred embodiment in that the handle arm 152 is coupled to the handle shaft 154 and is pivotable between a folded position and an operating position. A gap between the shaft brim member 156 and the rotation support portion 164 of the second preferred embodiment is sealed by a second seal member 157. The second seal member 157 is mounted to the shaft brim member 156, and includes a tapered lip 157a that makes contact with the inner peripheral surface of the rotation support portion 164. The first seal member 193 and the second seal member 157 can prevent foreign objects (e.g., liquid) from entering the interior of the rotation support portion 164.

As shown in FIG. 12, the handle shaft 154 is supported by the rotation control mechanism 126 at the lateral part of the reel unit 112 such that the handle shaft 154 is rotatable about the drive shaft 140. The handle shaft 154 includes a shaft body 181, a support shaft 182, a fixation bolt 183 and a spacer member 184. The shaft body 181 is coupled to and unitarily rotatable with the handle arm 152. The handle arm 152 is pivotably mounted to the tip end of the shaft body 181, whereas the fixation bolt 183 is screwed into a female threaded part 181a formed in the base end of the shaft body 181.

As shown in FIGS. 10 and 12, the support shaft 182 is disposed on the outer peripheral side of the shaft body 181. The support shaft 182 is also coupled to the shaft body 181 by the fixation bolt 183, and is unitarily rotatable therewith. The support shaft 182 is rotatably supported by the rotation support portion 164 through bearings 155a and 155b. The bearings 155a and 155b are disposed in axial alignment with each other within the rotation support portion 164. A positioning collar 155d is disposed between the bearing 155a and the bearing 155b. The support shaft 182 includes an outer peripheral surface 182a, an inner peripheral surface 182b, and a circular brim 182c. The brim 182c is formed on the outer peripheral surface 182a and has a larger diameter than the outer peripheral surface 182a. The outer peripheral surface 182a includes four straight parts 182d and four circular-arc parts 182e. The straight parts 182d are entirely disposed in a rectangular shape. Each of the circular arc parts 182e connects two adjacent straight parts 182d. Each circular-arc part 182e has a shape of a circular arc disposed about the rotational center HC. The bearings 155a and 155b are mounted onto the circular-arc parts 182e. On the other hand, a coupling portion 162 of the rotation control mechanism 126 is coupled onto and unitarily rotatable with the straight parts 182d. The inner peripheral surface 182b has a rectangular shape with C-chamfered corners. The spacer member 184 is coupled to and unitarily rotatable with the inner peripheral surface 182b.

The fixation bolt 183 fixes the shaft body 181 to the support shaft 182 through the spacer member 184 such that the shaft body 181 is unitarily rotatable with the support shaft 182. Additionally, the fixation bolt 183 supports an inner race 172 of a one-way roller clutch 166 such that the inner race 172 is rotatable with respect to the handle 114. The fixation bolt 183 includes a head 183a and a screw shaft 183b. The head 183a includes a tool lock part 183c, a support part 183d and a pressing part 183e. The support part 183d has a larger diameter than the tool lock part 183c. The pressing part 183e has a larger diameter than the support part 183d. A tool such as a driver or a hex rod wrench can be locked to the tool lock part 183c. The support part 183d supports the inner race 172 such that the inner race 172 is rotatable. The pressing part 183e presses the spacer member 184 toward the support shaft 182 and the shaft body 181.

The spacer member 184 is, for instance, a member made of a synthetic resin such as polyacetal. The spacer member 184 is constructed to prevent loosening of the fixation bolt 183 and to couple the support shaft 182 and the shaft body 181 such that the support shaft 182 and the shaft body 181 are unitarily rotatable. The spacer member 184 is disposed between the support shaft 182 and the shaft body 181. The spacer member 184 is pressed by the pressing part 183e of the fixation bolt 183, and couples the shaft body 181 to the support shaft 182 such that the shaft body 181 is unitarily rotatable with the support shaft 182. As shown in FIG. 10, the spacer member 184 includes a circular part 184a, a rectangular part 184b, a through hole 184c and an extended part 184d. The circular part 184a makes contact with the brim 182c-side end surface of the support shaft 182. The rectangular part 184b is fitted to the inner peripheral surface 182b of the support shaft 182. The through hole 184c enables the screw shaft 183b of the fixation bolt 183 to pass therethrough. The extended part 184d axially extends from one of the corners of the rectangular part 184b. The extended part 184d is engaged with the inner peripheral surface 182b of the support shaft 182 and the outer peripheral surface of the shaft body 181. The extended part 184d is constructed to fill the gap between the rectangular inner peripheral surface 182b of the support shaft 182 and the rectangular outer peripheral surface of the shaft body 181. Accordingly, wobbling can be prevented between the support shaft 182 and the shaft body 181. As a result, the extended part 184d prevents loosening of the fixation bolt 183.

<Rotation Control Mechanism>

The rotation control mechanism 126 is mounted between the handle 114 and the drive shaft 140. As shown in FIGS. 10 to 12, the rotation control mechanism 126 includes the coupling portion 162, the rotation support portion 164, the one-way roller clutch 166, the handle brake portion 168 and the handle stopper portion 170. The rotation control mechanism 126 is another example of a rotation control means.

<Coupling Portion>

The coupling portion 162 is mounted to and unitarily rotatable with one of the drive shaft 140 and the handle shaft 154. The coupling portion 162 is unitarily rotatable with the outer race 74 (to be described) of the one-way roller clutch 166. As shown in FIGS. 10 and 12, in the second preferred embodiment, the coupling portion 162 is engaged with and unitarily rotatable with the handle shaft 154. The coupling portion 162 also couples the handle shaft 154 and an outer race 74 such that the handle shaft 154 and the outer race 74 are unitarily rotatable. The coupling portion 162 includes a disc part 162a, at least one first ridge 162b and a non-circular hole 162c. The disc part 162a is coupled to and unitarily rotatable with the support shaft 182. The non-circular hole 162c is bored in the center of the disc part 162a. In the second preferred embodiment, the non-circular hole 162c has, for instance, a rectangular shape. The non-circular hole 162c is engaged with and unitarily rotatable with the straight parts 182d of the support shaft 182. The disc part 162a is disposed between the bearing 155b and the brim 182c of the support shaft 182. The one or more first ridges 162b are disposed on the outer peripheral part of the disc part 162a, and protrude in the axial direction of the drive shaft 140 so as to be engaged with the recesses 74a of the outer race 74. Similarly in the second preferred embodiment, a plurality of (e.g., six) first ridges 162b are circumferentially disposed at intervals. The axial protruding length of each first ridge 162b is smaller than the thickness of the outer race 74. Similarly in the second preferred embodiment, the axial protruding length of each first ridge 162b is slightly smaller than half the thickness of the outer race 74.

<Rotation Support Portion>

As shown in FIGS. 10 and 12, the rotation support portion 164 is fixed to either the mount part 112g of the reel body (not shown in the drawings) or that of the lid member 112d in the reel unit 112. The rotation support portion 164 supports the handle shaft 154 such that the handle shaft 154 is rotatable. The rotation support portion 164 includes an accommodation part 164a and a bearing mount part 164b. The accommodation part 164a has a closed-end tubular shape and accommodates the one-way roller clutch 166. The bearing mount part 164b has a tubular shape and protrudes from the inner periphery of the accommodation part 164a. A slight step 164c for positioning (see FIG. 12) is formed on the inner peripheral surface of the accommodation part 164a in order to position a holding member 178 to be described. A plurality of (e.g., three) fixation tabs 164d (see FIG. 10) are formed on the lid member 112d-side region of the outer peripheral surface of the accommodation part 164a. The fixation tabs 164d are circumferentially disposed at intervals and extend radially outward. The rotation support portion 164 is fixed to either the lid member 112d or the reel body by the three screw members 165, which are screwed into screw holes 112h of the mount part 112g while penetrating the fixation tabs 164d. The bearings 155a and 155b are mounted to the inner peripheral surface of the bearing mount part 164b, while being axially positioned.

<One-Way Roller Clutch>

Figure 13:
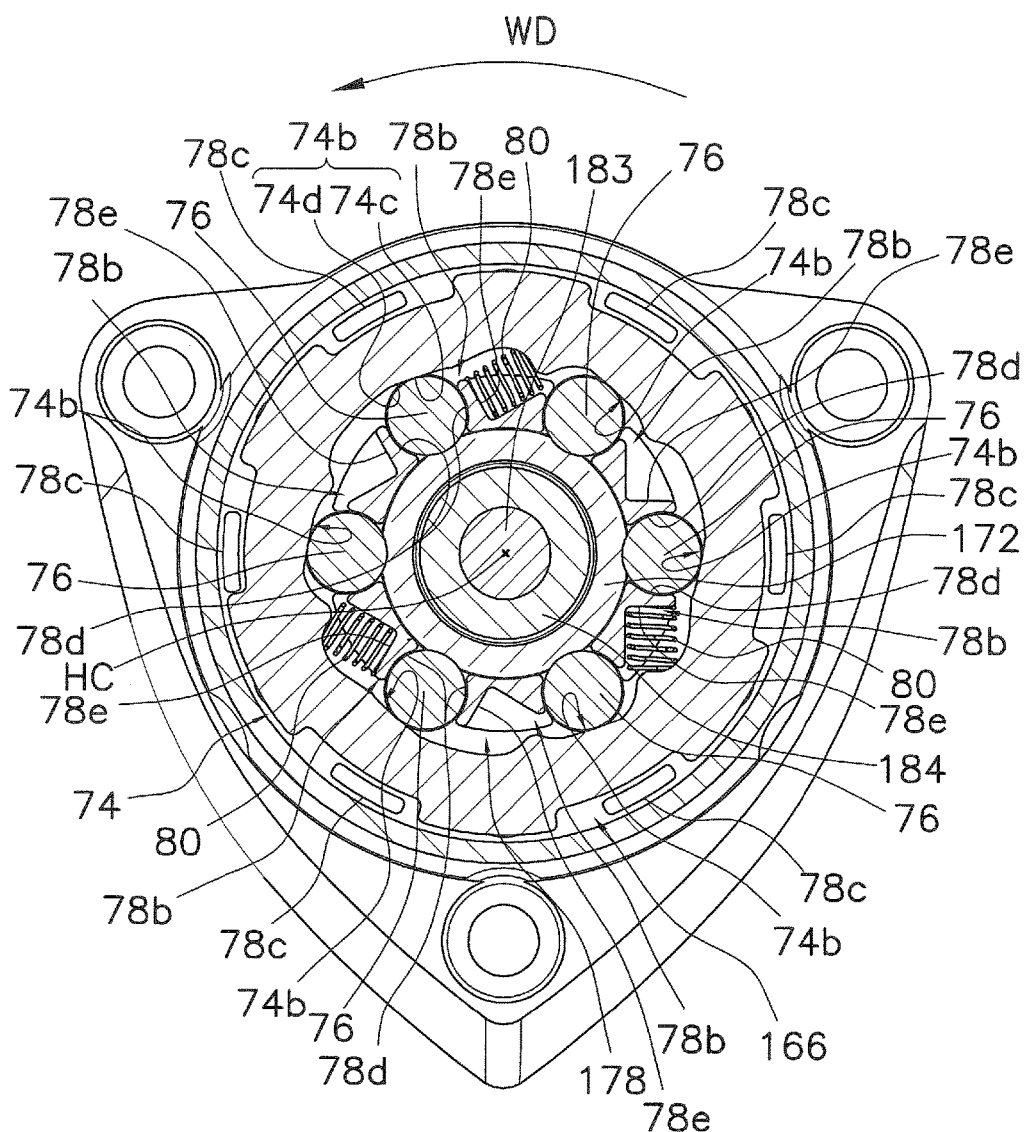
FIG. 13 is a cross-sectional view of FIG. 12 taken along line XIII-XIII.

As shown in FIGS. 11 to 13, except for the inner race 172 and the holding member 178, the one-way roller clutch 166 has the same construction as the first preferred embodiment. The one-way roller clutch 166 is configured to transmit the rotation of the handle 114 to the drive shaft 140 only when the rotational direction of the handle 114 is a fishing-line winding direction WD (see FIG. 13). The one-way roller clutch 166 is accommodated in the rotation support portion 164. The one-way roller clutch 166 includes the inner race 172, the outer race 74, a plurality of (e.g., six) rollers 76, a holding member 178 (see FIGS. 11 and 12) and at least one urging member 80. The number of the urging members 80 can be equal to that of the rollers 76, or alternatively, can be less than that of the rollers 76. In the second preferred embodiment, the one or more urging members 80 are, for instance, coil springs. The number of the urging members 80 is half the number of the rollers 76 (e.g., three).

The inner race 172 is a stepped hollow cylindrical roller member made of a metal. The inner race 172 is mounted to and unitarily rotatable with one of the drive shaft 140 and the handle 114. In the second preferred embodiment, the inner race 172 is mounted to the drive shaft 140 such that the inner race 172 is detachable from and unitarily rotatable with the drive shaft 140. As shown in FIGS. 11 and 12, the inner race 172 includes a tubular coupling part 172a (see FIG. 12) on the drive shaft 140-side end thereof (first end). The tubular coupling part 172a has a non-circular cross-section. The tubular coupling part 172a is coupled to and unitarily rotatable with one of non-circular coupling holes 140a bored in both ends of the drive shaft 140. The inner race 172 includes a circular mount hole part 172b in the handle shaft 154-side end thereof (second end). A bearing 155c is mountable to the mount hole part 172b. The inner race 172 is rotatably supported by the support part 183d of the fixation bolt 183 through the bearing 155c. A washer 198 is mounted between the inner race 172 and the bearing 46a supporting the drive shaft 140.

Figure 14:
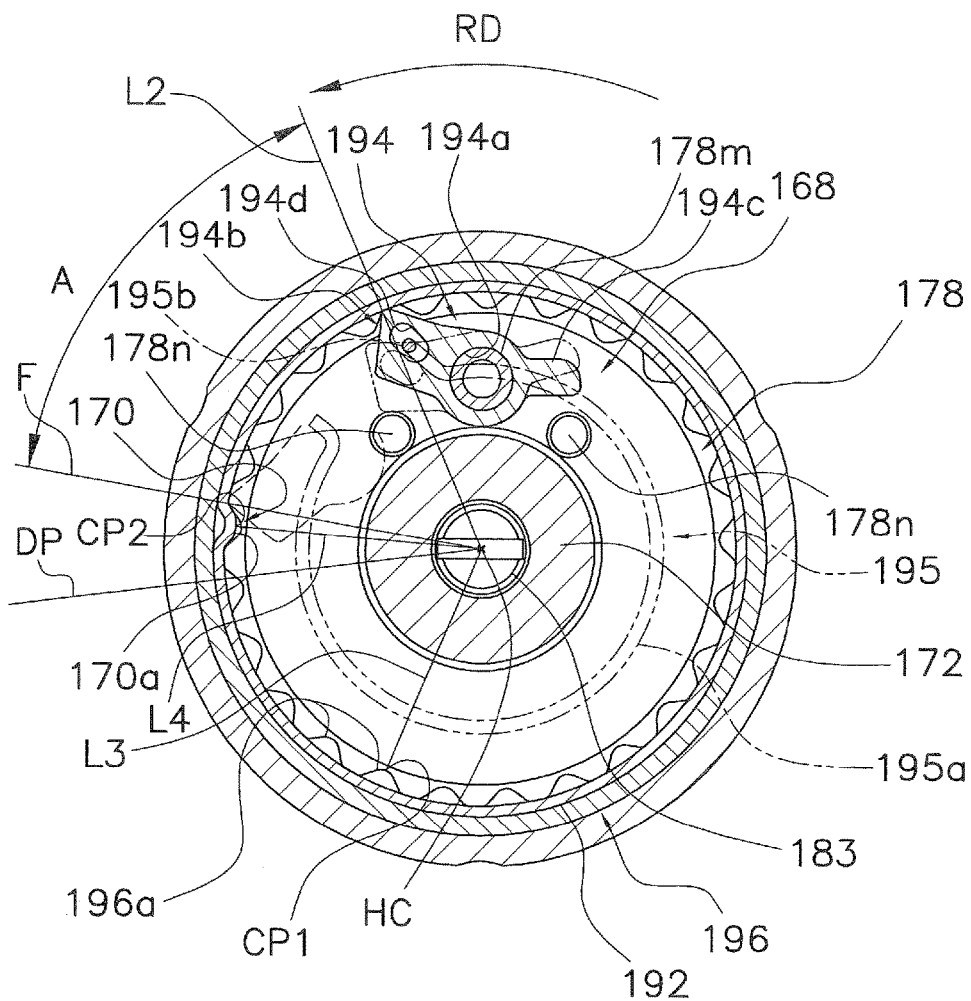
FIG. 14 is a cross-sectional view of FIG. 12 taken along line XIV-XIV.

The holding member 178 is a member on which the rollers 76 are circumferentially disposed at intervals. The holding member 178 is rotatably mounted to the inner peripheral surface of the accommodation part 164a of the rotation support portion 164. Constituent elements of the handle 114-side surface of the holding member 178, including the body 78a, the holding parts 78b, the second ridges 78c and so forth, are the same as their corresponding elements in the first preferred embodiment. Therefore, the reference signs assigned to the corresponding elements will be assigned to the constituent elements in FIG. 11, and explanation of these constituent elements will not be hereinafter explained. As shown in FIG. 14, the holding member 178 includes a pivot shaft 178m on the mount part 112g-side surface thereof. The pivot shaft 178m protrudes in parallel to the rotational center HC. The pivot shaft 178m supports a pawl member 194 (to be described) of the handle brake portion 168 such that the pawl member 194 is pivotable about the pivot shaft 178m. A pair of restriction protrusions 178n is formed on the holding member 178, and is disposed on both sides of the pivot shaft 178m. The restriction protrusions 178n restrict the pivot range of the pawl member 194. The outer race 74, the plural rollers 76 and the urging members 80 in the one-way roller clutch 166 are substantially the same as those in the first preferred embodiment, and therefore, will not be hereinafter explained.

<Handle Brake Portion>

As shown in FIGS. 11, 12 and 14, the handle brake portion 168 is configured to apply a braking force to the rotation of the handle 114 when the rotational direction of the handle 114 is the reverse direction RD relative to the fishing-line winding direction WD. The handle brake portion 168 is another example of handle braking means. For example, chances are that the handle 114 is rotated in the reverse direction RD (counterclockwise direction in FIG. 14) relative to the fishing-line winding direction WD due to slight friction of the one-way roller clutch 166 or so forth. To prevent this, the handle brake portion 168 is provided. It should be noted that similarly in the second preferred embodiment, explanation will be provided for a construction of the spinning reel 110 of a left handle type that the handle 114 is disposed on the left side of the reel unit 112 in a rear-side view.

The handle brake portion 168 includes the pawl member 194, the spring member 195, a brake member 196 and the elastic ring 197. The pawl member 194 is mounted to the pivot shaft 178m of the holding member 178 such that the pawl member 194 is pivotable about an axis arranged in parallel to the rotational center HC. The pawl member 194 is configured to pivot between an engaged position depicted with solid line in FIG. 14 and a remote position depicted with dashed line in FIG. 14. The pawl member 194 is engaged with the brake member 196 in the engaged position, and is separated from the brake member 196 in the remote position. The pawl member 194 includes a support hole 194a mounted onto the pivot shaft 178m, a pawl part 194b, a restriction part 194c and a spring hook hole 194d. The pawl part 194b extends to the tip of the pawl member 194 from a part in which the support hole 194a is bored, and is engageable with the brake member 196. The pawl part 194b occupies the tip of the pawl member 194 and has an acute angle. The pawl part 194b is configured to be contacted to one of the pair of restriction protrusions 178n (left-side one in FIG. 14). With the pawl part 194b, the pivot range of the pawl member 194 is restricted in the counterclockwise direction in FIG. 14. The restriction part 194c extends oppositely to the pawl part 194b through the support hole 194a, and is configured to be contacted to the other of the pair of restriction protrusions 178n. With the restriction part 194c, the pivot range of the pawl member 194 is restricted in the clockwise direction in FIG. 14. By thus restricting the pivot range of the pawl member 194, the pawl member 194 becomes unlikely to be detached from the pivot shaft 178m in winding the fishing line at a high speed. The spring hook hole 194d is bored in the pawl part 194b and has an oval shape.

In the second preferred embodiment, the spring member 195 is not a member for braking but an urging member that is configured to urge the pawl member 194 toward the remote position when the handle 114 is rotated in the fishing-line winding direction WD. Additionally, the spring member 195 is configured to urge the pawl member 194 toward the engaged position when the handle 114 is rotated in the reverse direction RD relative to the fishing-line winding direction WD. As shown in FIGS. 11, 12 and 14, the spring member 195 includes the curved part 195a and a hook part 195b. It should be noted that in FIG. 14, the spring member 195 does not appear on a cross section, and is hence depicted with dashed two-dotted line. The curved part 195a is mounted to and frictionally engageable with the first annular groove 190a. In FIG. 14, the curved part 195a curves in the counterclockwise direction and then bends to the outer peripheral side. The curved part 195a is configured to be loosened when the handle 114 is rotated in the fishing-line winding direction WD, and is configured to be tightened when the handle 114 is rotated in the reverse direction RD. When the curved part 195a is tightened, the hook part 195b is pulled and thereby the pawl member 194 is urged in the clockwise direction of FIG. 14 about the pivot shaft 178m. Accordingly, the pawl member 194 pivots to the engaged position. The curved part 195a further bends toward the holding member 178 in parallel to the rotational center HC, and the bending part is constructed as the hook part 195b. The hook part 195b is hooked in the spring hook hole 194d.

In the handle brake portion 168 constructed as described above, when the handle 114 is rotated in the reverse direction RD, the curved part 195a is configured to be tightened and the hook part 195b is thereby pulled. Accordingly, the tip of the pawl member 194 is urged by the hook part 195b, and pivots radially outward. As a result, the tip of the pawl member 194 is engaged with internal teeth 196a of the brake member 196, and the brake member 196 is rotated in the reverse direction RD. The brake member 196 is frictionally engaged with the annular member 192 of the reel unit 112 by the elastic ring 197. With the construction, the rotation of the handle 114 in the reverse direction RD is braked by the brake member 196 through the pawl member 194 and the holding member 178. When the curved part 195a is loosened by the rotation of the handle 114 in the fishing-line winding direction WD, the pawl member 194 pivots to the remote position. Additionally, resistance is not generated against the rotation of the handle 114 due to loosening of the curved part 195a.

The brake member 196 is a ring-shaped member made of a metal. The brake member 196 is mounted to the reel unit 112 such that the brake member 196 is rotatable about the drive shaft 140. The brake member 196 includes the plural internal teeth 196a configured to be engaged with the pawl part 194b of the pawl member 194 disposed in the engaged position. Each internal tooth 196a has a line symmetric shape with respect to third line L3 connecting the rotational center HC and a circumferential center position CP1 of each internal tooth 196a. With the construction, the brake member 196 is usable regardless of the mount position of the handle 114 on the reel unit 112, i.e., regardless of the right or left side of the reel unit 112. The brake member 196 is rotatably mounted to the large diameter part 192c of the annular member 192 included in the reel unit 112. The brake member 196 is mounted to the annular member 192 in a condition that the elastic ring 197 mounted to the second annular groove 192e is compressed. Therefore, the brake member 196 is frictionally engaged with the annular member 192 by the elastic ring 197.

In the handle brake portion 168 constructed as described above, when the handle 114 is rotated in the reverse direction RD relative to the fishing-line winding direction WD, the curved part 195a of the spring member 195 is reduced in diameter and is tightened. Accordingly, the hook part 195b urges the pawl member 194 toward the engaged position, and the pawl member 194 is engaged with the internal teeth 196a of the brake member 196. When the pawl member 194 is engaged with the internal teeth 196a, the brake member 196 frictionally engaged with the annular member 192 of the reel unit 112 is rotated in the reverse direction RD while being braked. Accordingly, rotation of the handle 114 is braked in the reverse direction RD relative to the fishing-line winding direction WD. Contrarily, when the handle 14 is rotated in the fishing-line winding direction WD, the curved part 195a of the spring member 195 is increased in diameter and is loosened. Accordingly, the pawl member 194 is urged toward the remote position. With the construction, even when the handle 114 is rotated in the fishing-line winding direction WD, the brake member 196 is not rotated. Simultaneously, when a centrifugal force acts on the pawl member 194 in the rotation of the handle 114 in the fishing-line winding direction WD, the pawl member 194 is unlikely to be moved to the engaged position.

<Handle Stopper Portion>

As shown in FIGS. 11, 12 and 14, the handle stopper portion 170 is configured to stop the rotation of the handle 114 at the predetermined rotational phase F only when the handle 114 is rotated in the reverse direction RD relative to the fishing-line winding direction WD. The handle stopper portion 170 is another example of a handle stopper means. When the fishing rod is raised upright, the predetermined rotational phase F is located nearer to the fishing rod side than a rotational phase DP corresponding to the bottom dead center of the handle 114. In FIG. 14, an angle A is formed by the predetermined rotational phase F and second straight line L2 arranged in parallel to the spool shaft 16, both of which intersect at the rotational center HC of the handle shaft 154. For example, the angle A is in a range of 40 to 140 degrees. In the second preferred embodiment, as shown in FIG. 14, the angle A is set to be, for instance, roughly 70 degrees.

The handle stopper portion 170 includes the pawl member 194 and the protruding part 170a formed on the annular member 192 of the reel unit 112. The protruding part 170a has the same circumferential length as each internal tooth 196a, and protrudes roughly in the same shape as each internal tooth 196a. The protruding part 170a enables the pawl part 194b of the pawl member 194 to be engaged therewith. The protruding part 170a has a line symmetric shape with respect to fourth line L4 connecting the rotational center HC and a circumferential center position CP2 of the protruding part 170a. With the construction, the annular member 192 is usable regardless of the mount position of the handle 114 on the reel unit 112, i.e., regardless of the right or left side of the reel unit 112. Therefore, the pawl part 194b of the pawl member 194 is mounted in a position where the pawl part 194b is meshable with the internal teeth 196a and the protruding part 170a. When the holding member 178 is rotated in the reverse direction RD during braking and the pawl part 194b of the pawl member 194 is engaged with the protruding part 170a, the handle 114 is stopped from rotating in the reverse direction RD.

The handle stopper portion 170 constructed as described above is configured to stop the handle 114 from rotating in the reverse direction RD with use of the pawl member 194 that is also included in the handle brake portion 168 as its constituent element. Therefore, the handle stopper portion 170 is implemented with a simple construction.

<Action of Handle Control Mechanism>

In dealing with movement of hooked fish by rotating the rotor 20 in the fishing-line releasing direction, a braking force is similarly regulated by an operation of pulling the brake lever 36 toward the fishing rod attachment 12c in the second preferred embodiment.

At this time, the fishing-line releasing directional rotation of the rotor 20 is transmitted to the drive shaft 140 through the pinion gear 44 and the drive gear 42. However, in the second preferred embodiment, the rotation control mechanism 126 similarly includes the one-way roller clutch 166 configured to transmit the rotation of the handle 114 to the drive shaft 140 only when the rotation of the handle 114 is oriented in the fishing-line winding direction WD. Therefore, even when the drive shaft 140 is reversely rotated, the one-way roller clutch 166 is instantly disengaged. Accordingly, the handle 114 can be instantly prevented from rotating in the reverse direction RD relative to the fishing-line winding direction WD.

Incidentally, chances are that when the handle 114 is released from the hand of an angler, the handle 114 is rotated in the reverse direction RD relative to the fishing-line winding direction WD. However, at this time, the pawl member 194 of the handle brake portion 168 is urged to the engaged position by the spring member 195, and the brake member 196 is rotated in the reverse direction RD. Thus, the handle 114 is braked by the handle brake portion 168. Moreover, when the pawl member 194 is contacted to the protruding part 170a, the handle stopper portion 170 stops the rotation of the handle 114 at the predetermined rotational phase F.

When the handle 114 is moved from its mount position in the spinning reel 110 of the left handle type shown in FIG. 12 to that in the spinning reel 110 of the right handle type, the rotation support portion 164 is detached from the mount part 112g of the lid member 112d. Additionally, the spring member 195 of the handle brake portion 168 is detached from the first annular groove 190a of the spring holding member 190. Moreover, the annular member 192 is detached from the mount part 112g of the lid member 112d in a condition that the elastic ring 197 is mounted to the annular member 192. The spring member 195 herein detached is a member provided exclusively for the left handle type. As shown in FIG. 11, a spring member 295 is a member provided for a right handle type. In the spring member 295, a curved part 295a has the same shape as the curved part 195a of the spring member 195, but a hook part 295b bends from the curved part 295a in a direction oppositely to the hook part 195a of the spring member 195. The spring member 295 for the right handle type is mounted to the spring holding member 190. Then, the holding member 178 is detached from the rotation support portion 164, and the outer race 74 is attached to the rotation support portion 164 in a condition that its front-back orientation shown in FIG. 13 is reversed. Next, the holding member 178 is restored to the rotation support portion 164, and each urging member 80 is disposed on the opposite side of its original position in the construction for the left handle type through each roller 76. Under that condition, the cover member 199 is detached from the mount part 112g of the reel body, and the spring holding member 190 detached by this time and the annular member 192 detached as described above are again mounted to the mount part 112g of the reel body. In this mounting, the hook part 295b of the spring member 295 is engaged with the spring hook hole 194d of the pawl member 194. Under that condition, the rotation support portion 164 is fixed to the mount part 112g of the reel body by the screw members 165. Accordingly, the spinning reel 110 of the right handle type is implemented, with reverse handle rotation being prevented.

Finally, the cover member 199 is fixed to the mount part 112g of the lid member 112d. With that construction, the rotation control mechanism 126 can be commonly used between the spinning reel of the left handle type and that of the right handle type only by manufacturing the spring member for the spinning reel of the right handle type.

Incidentally, in changing the construction of preventing reverse rotation of the handle 114 into the construction of allowing it, the rotation control mechanism 126 is detached by detaching the rotation support portion 164 from the mount part 112g. Then, it is only required to prepare a handle shaft that can be directly engaged with the coupling hole 140a of the drive shaft 140. In this case, the rotation support portion 164 can be constructed to support the handle shaft herein prepared.

<Features>

The aforementioned preferred embodiments can be expressed as follows.

(A) The spinning reel 10 is a type of reel configured to forwardly reel out a fishing line. The spinning reel 10 includes the reel unit 12, the handle 14, the spool shaft 16, the spool 18 for winding the fishing line, the rotor 20, the rotation transmission mechanism 24 and the rotation control mechanism 26. The handle 14 is rotatably mounted to a lateral part of the reel unit 12. The spool shaft 16 is mounted to the reel unit 12 so as to be movable back and forth. The spool 18 for winding the fishing line is mounted to a front part of the spool shaft 16. The rotor 20 winds the fishing line onto the spool 18. The rotor 20 is mounted to the reel unit 12 so as to be rotatable about the spool shaft 16 in both the fishing-line winding direction and the fishing-line releasing direction. The rotation transmission mechanism 24 is configured to transmit the rotation of the handle 14 to the rotor 20. The rotation transmission mechanism 24 includes the drive shaft 40, the drive gear 42 and the pinion gear 44. The drive shaft 40 is mounted to the reel unit 12 so as to be rotatable about an axis arranged skew to the spool shaft 16. The drive gear 42 is mounted to the drive shaft 40 so as to be unitarily rotatable therewith. The pinion gear 44 is mounted to the spool shaft 16 so as to be rotatable about the spool shaft 16, and is meshed with the drive gear 42. The rotation control mechanism 26 is mounted between the handle 14 and the drive shaft 40. The rotation control mechanism 26 is configured to transmit the rotation of the handle 14 to the drive shaft 40 only when the handle 14 is rotated in the fishing-line winding direction WD. The rotation control mechanism 26 includes the handle brake portion 68. The handle brake portion 68 is configured to apply a braking force to the rotation of the handle 14 when the handle 14 is rotated in the reverse direction RD relative to the fishing-line winding direction WD.

In the spinning reel 10, when the handle 14 is rotated in the fishing-line winding direction WD, the rotation of the handle 14 is configured to be transmitted to the rotor 20 through the rotation control mechanism 26 and the rotation transmission mechanism 24. Accordingly, the rotor 20 is rotated in the fishing-line winding direction. When the handle 14 is rotated in the reverse direction RD relative to the fishing-line winding direction WD, the rotation of the handle 14 is configured to be braked by the handle brake portion 68. Therefore, the handle 14 is configured not to be moved in accordance with the rotation of the rotor 20 in the fishing-line releasing direction.

(B) The rotation control mechanism 26 can include the one-way roller clutch 66. The one-way roller clutch 66 can be configured to transmit the rotation of the handle 14 to the drive shaft 40 only when the handle 14 is rotated in the fishing-line winding direction WD. In this case, the rotation of the handle 14 is configured not to be transmitted to the drive shaft 40 when the handle is rotated in the reverse direction RD relative to the fishing-line winding direction WD. Thus, the rotation of the handle 14 can be reliably braked when the handle 14 is rotated in the reverse direction RD relative to the fishing-line winding direction WD.

(C) The rotation control mechanism 26 can further include the handle stopper portion 70. The handle stopper portion 70 can be configured to stop the rotation of the handle 14 at the predetermined rotational phase F when the handle 14 is rotated in the reverse direction RD relative to the fishing-line winding direction WD. In this case, the rotation of the handle 14 is configured to be stopped at the predetermined rotational phase F.

(D) The handle brake portion 68 can be the spring member 68*a* mounted between the rotation control mechanism 26 and the reel unit 12. In this case, the handle brake portion 68 can be simply constructed by the spring member 68*a*.

(E) The spring member 68*a* can be made of a metallic spring wire rod. In this case, the handle brake portion 68 can be more simply constructed by metal working of the metallic spring wire rod.

(F) The spring member 68*a* can include the curved part 68*b* and the spring hook part 68*c*. The curved part 68*b* can be frictionally engaged with one of the rotation control mechanism 26 and the reel unit 12. The curved part 68*b* can be configured to be tightened when the handle 14 is rotated in the reverse direction RD relative to the fishing-line winding direction WD, and can be configured to be loosened when the handle 14 is rotated in the fishing-line winding direction WD. The spring hook part 68*c* can bend from the curved part 68*b* and can be hooked to the other of the rotation control mechanism 26 and the reel unit 12. In this case, the curved part 68*b* is configured to be loosened when the handle 14 is rotated in the fishing-line winding direction WD. Thus, the handle 14 is configured not to be braked. The curved part 68*b* is configured to be tightened and frictionally engaged with one of the rotation control mechanism 26 and the reel unit 12 when the handle 14 is rotated in the reverse direction RD relative to the fishing-line winding direction WD. Thus, the handle 14 is configured to be braked. Consequently, the handle 14 can be herein braked in accordance with the rotational direction of the handle 14.

(G) The one-way roller clutch 166 can include the inner race 172, the outer race 74, the plural rollers 76 and the holding member 178. The inner race 172 can be mounted to one of the drive shaft 140 and the handle 114 so as to be unitarily rotatable therewith. The outer race 74 can be mounted to the other of the drive shaft 140 and the handle 114 so as to be unitarily rotatable therewith. The plural rollers 76 can be disposed between the inner race 172 and the outer race 74 and can be circumferentially aligned at intervals. Each of the rollers 76 can be circumferentially movable in the transmission allowed position for allowing a transmission of the rotation and the transmission prevented position for preventing the transmission of the rotation. The holding member 178 can arrange the rollers 76 to be circumferentially aligned at intervals. In this case, the rotation of the handle 114 is configured not to be transmitted to the drive shaft 140 from the inner race 172 (or the outer race) through the outer race 74 (or the inner race) when the handle 114 is rotated in the reverse direction RD relative to the fishing-line winding direction WD.

(H) The one-way roller clutch 166 can be constructed such that the inner race 172 is mounted to the drive shaft 140 so as to be unitarily rotatable therewith, and the outer race 74 is mounted to the handle 114 so as to be unitarily rotatable therewith. The handle brake portion 168 can include the pawl member 194, the spring member 195, the brake member 196 having a ring shape, and the elastic ring 197. The pawl member 194 can be pivotably mounted to the holding member 178. The spring member 195 can include the curved part 195*a* and the hook part 195*b*. The curved part 195*a* can be frictionally engaged with the reel unit 112, and can be rotatable about the rotational center HC of the handle 114. The curved part 195*a* can be configured to be loosened when the handle 114 is rotated in the fishing-line winding direction WD, and can be configured to be tightened when the handle 114 is rotated in the reverse direction RD relative to the fishing-line winding direction WD. The hook part 195*b* can be disposed on one end of the curved part 195a, and can be hooked to the tip of the pawl member 194. The brake member 196 can be mounted to the reel unit 112 so as to be rotatable about the drive shaft 140. The brake member 196 can include the plural internal teeth 196a enabling the tip of the pawl member 194 to be engaged therewith. The elastic ring 197 can be disposed between the reel unit 112 and the brake member 196. The elastic ring 197 can cause the brake member 196 to be frictionally engaged with the reel unit 112.

In this case, when the handle 114 is rotated in the reverse direction RD, the holding member 178 is configured to be rotated in the reverse direction RD in conjunction with the handle 114. When the holding member 178 is rotated in the reverse rotation RD, the curved part 195a of the spring member 195 is configured to be tightened. Thus, the hook part 195b pulls the pawl member 194. Accordingly, the tip of the pawl member 194 is urged by the hook part 195b, and is caused to pivot radially outward. As a result, the tip of the pawl member 194 is engaged with the internal teeth 196a of the brake member 196, and the brake member 196 is rotated in the reverse direction RD. The brake member 196 is frictionally engaged with the annular member 192 of the reel unit 112 by the elastic ring 197. Hence, the rotation of the handle 114 in the reverse direction RD is braked by the brake member 196 through the pawl member 194 and the holding member 178.

Contrarily, when the handle 114 is rotated in the fishing-line winding direction WD, the curved part 195a is configured to be loosened. Accordingly, the tip of the pawl member 194 is caused to pivot radially inward by the hook part 195b. Therefore, the pawl member 194 is disengaged from the internal teeth 196a, and the handle 114 is not braked. Consequently, the handle 114 can be herein reliably braked in accordance with the rotational direction of the handle 114. Additionally, the brake member 196 and the reel unit 112 are frictionally engaged by the elastic ring 197. Hence, a frictional force is stabilized.

(I) The reel unit 112 can include the spring holding member 190 having an annular shape. The spring holding member 190 can include the first annular groove 190a enabling the curved part 195a of the spring member 195 to be frictionally engaged therewith. In this case, the spring member 195 can be held by the annular spring holding member 190. Hence, the other constituent elements of the reel unit 112 are simply constructed.

(J) The reel unit 112 can include the annular member 192. The annular member 192 can be disposed on the outer peripheral side of the spring holding member 190, and can include the second annular groove 192e on the outer peripheral surface thereof. The second annular groove 192e can enable the elastic ring 197 to be mounted thereto. In this case, the elastic ring 197 is mounted to the annular member 192. Hence, the other constituent elements of the reel unit 112 are simply constructed.

(K) The rotation control mechanism 126 can further include the handle stopper portion 170. The handle stopper portion 170 can be configured to stop the rotation of the handle 114 at the predetermined rotational phase F when the handle 114 is rotated in the reverse direction RD relative to the fishing-line winding direction WD. The handle stopper portion 170 can include the protruding part 170a. The protruding part 170a can protrude from the annular member 192 to the inner peripheral side so as to be contactable to the pawl member 194. In this case, the rotation of the handle 114 is stopped together with the rotation of the holding member 178 when the pawl member 194, configured to pivot while being engaged with the internal teeth 196a of the brake member 196 by the rotation of the holding member 178, is contacted to the protruding part 170a.

(L) The reel unit 112 can include the reel body and the lid member 112d. The reel body can include the mechanism accommodation space in the interior thereof. The lid member 112d can be a member for closing the reel body. The spring holding member 190 and the annular member 192 can be non-rotatably and detachably mountable to any one of the reel body and the lid member 112d from outside. In this case, the one-way roller clutch 116, the spring holding member 190, the annular member 192 and so forth are commonly usable between the spinning reel of the right handle type and that of the left handle type.

<Other Preferred Embodiments>

One preferred embodiment of the present specification has been explained above. However, the present specification is not limited to the above, and a variety of changes can be made without departing from the scope of the present specification. Especially, the plural preferred embodiments and modifications described in the present specification can be arbitrarily combined on an as-needed basis.

(a) In the first preferred embodiment, the handle brake portion 68 is made of a metal spring wire rod. However, in the present specification, the construction of the handle brake portion 68 is not limited to the above. An elastic member made of a synthetic rubber or the like can be disposed such that the elastic member is contactable/separable to/from the rotation control mechanism 26. The elastic member can be configured to be contacted to the rotation control mechanism 26 when the handle 14 is rotated in the reverse direction RD relative to the fishing-line winding direction WD. In this construction, the spring member 68a in the aforementioned preferred embodiment can be used as a control member for contacting/separating the elastic member to/from the rotation control mechanism 26.

(b) In the first preferred embodiment, the curved part 68b of the spring member 68a of the handle brake portion 68 is disposed on the holding member 78 forming a part of the rotation control mechanism 26. However, the curved part 68b can be constructed to be disposed on the reel unit 12. In this case, the curved part 68b can be constructed to be disposed on the holding member 78.

(c) In the second preferred embodiment, the pawl member 194 is provided with the support hole 194a, whereas the holding member 178 is provided with the pivot shaft 178m. Contrarily to this, the holding member 178 can be provided with a circular recess, whereas the pawl member 194 can be provided with a shaft part to be fitted into the recess of the holding member 178.

(d) In the second preferred embodiment, the spring members 195 and 295, having different constructions, are provided for the spinning reel 110 of the left handle type and that of the right handle type. However, when a spring member having a radially bending lock part is prepared, this spring member can be commonly used between the spinning reel of the left handle type and that of the right handle type.

What is claimed is:

1. A spinning reel configured to forwardly reel out a fishing line, the spinning reel comprising:
   a reel unit;
   a handle rotatably mounted to a lateral part of the reel unit;
   a spool shaft mounted to the reel unit so as to be movable back and forth;
   a spool for winding the fishing line, the spool mounted to a front part of the spool shaft;

a rotor that winds the fishing line onto the spool, the rotor mounted to the reel unit so as to be rotatable about the spool shaft in both a fishing-line winding direction and a fishing-line releasing direction;

a rotation transmission mechanism configured to transmit a rotation of the handle to the rotor, the rotation transmission mechanism including a drive shaft, a drive gear and a pinion gear, the drive shaft mounted to the reel unit so as to be rotatable about an axis arranged skew to the spool shaft, the drive gear mounted to the drive shaft so as to be unitarily rotatable therewith, the pinion gear mounted to the spool shaft so as to be rotatable thereabout, the pinion gear meshed with the drive gear; and a rotation control mechanism mounted between the handle and the drive shaft, the rotation control mechanism configured to transmit the rotation of the handle to the drive shaft only when the handle is rotated in a direction corresponding to the fishing-line winding direction, the rotation control mechanism including a handle brake portion, the handle brake portion configured to apply a braking force to the rotation of the handle when the handle is rotated in a reverse direction relative to the direction corresponding to the fishing-line winding direction.

2. The spinning reel according to claim 1, wherein the rotation control mechanism includes a one-way roller clutch, the one-way roller clutch configured to transmit the rotation of the handle to the drive shaft only when the handle is rotated in the direction corresponding to the fishing-line winding direction.

3. The spinning reel according to claim 2, wherein the one-way roller clutch includes an inner race mounted to one of the drive shaft and the handle so as to be unitarily rotatable therewith, an outer race mounted to the other of the drive shaft and the handle so as to be unitarily rotatable therewith, a plurality of rollers disposed between the inner race and the outer race, the rollers circumferentially aligned at intervals, each of the rollers circumferentially movable in a transmission allowed position for allowing a transmission of the rotation and a transmission prevented position for preventing the transmission of the rotation, and a holding member arranging the rollers to be circumferentially aligned at intervals.

4. The spinning reel according to claim 3, wherein the one-way roller clutch is constructed such that the inner race is mounted to the drive shaft so as to be unitarily rotatable therewith, and the outer race is mounted to the handle so as to be unitarily rotatable therewith, and the handle brake portion includes a pawl member pivotably mounted to the holding member, a spring member including a curved part and a hook part, the curved part frictionally engaged with the reel unit, the curved part rotatable about a rotational center of the handle, the curved part configured to be loosened when the handle is rotated in the direction corresponding to the fishing-line winding direction, the curved part configured to be tightened when the handle is rotated in the reverse direction relative to the direction corresponding to the fishing-line winding direction, the hook part disposed on one end of the curved part, the hook part hooked to a tip of the pawl member, a brake member having a ring shape, the brake member mounted to the reel unit so as to be rotatable about the drive shaft, the brake member including a plurality of internal teeth enabling the tip of the pawl member to be engaged therewith, and an elastic ring disposed between the reel unit and the brake member, the elastic ring causing the brake member to be frictionally engaged with the reel unit.

5. The spinning reel according to claim 4, wherein the reel unit includes a spring holding member having an armular shape, the spring holding member including a first annular groove enabling the curved part of the spring member to be frictionally engaged therewith.

6. The spinning reel according to claim 5, wherein the reel unit includes an annular member, the annular member disposed on an outer peripheral side of the spring holding member, the armular member including a second annular groove on an outer peripheral surface thereof, the second annular groove enabling the elastic ring to be mounted thereto.

7. The spinning reel according to claim 6, wherein the rotation control mechanism includes a handle stopper portion, the handle stopper portion configured to stop the rotation of the handle at a predetermined rotational phase when the handle is rotated in the reverse direction relative to the direction corresponding to the fishing-line winding direction, and the handle stopper portion includes a protruding part, the protruding part protruding from the annular member to an inner peripheral side so as to be contactable to the pawl member.

8. The spinning reel according to claim 6, wherein the reel unit includes a reel body including a mechanism accommodation space in an interior thereof, and a lid member for dosing the reel body, and the spring holding member and the annular member are non-rotatably and detachably mountable to any one of the reel body and the lid member from outside. direction.

9. The spinning reel according to claim 1, wherein the rotation control mechanism includes a handle stopper portion, the handle stopper portion configured to stop the rotation of the handle at a predetermined rotational phase when the handle is rotated in the reverse direction relative to the direction corresponding to the fishing-line winding direction.

10. The spinning reel according to claim 1, wherein the handle brake portion is a spring member mounted between the rotation control mechanism and the reel unit.

11. The spinning reel according to claim 10, wherein the spring member is made of a metallic spring wire rod.

12. The spinning reel according to claim 11, wherein the spring member includes a curved part frictionally engaged with one of the rotation control mechanism and the reel unit, the curved part configured to be tightened when the handle is rotated in the reverse direction relative to the direction corresponding to the fishing-line winding direction, the curved part configured to be loosened when the handle is rotated in the direction corresponding to the fishing-line winding direction, and a spring hook part bending from the curved part, the spring hook part hooked to the other of the rotation control mechanism and the reel unit.

13. A method of manufacturing a spinning reel that forwardly reels out a fishing line, the method comprising:

rotatably mounting a handle to a lateral part of a reel unit;

mounting a spool shaft to the reel unit, the spool shaft movable back and forth;

mounting a spool to a front part of the spool shaft, the spool for winding the fishing line;

mounting a rotor to the reel unit, the rotor rotatable about the spool shaft in both a fishing-line winding direction and a fishing-line releasing direction, the rotor for winding the fishing line onto the spool;

mounting a drive shaft to the reel unit, the drive shaft rotatable about an axis arranged skew to the spool shaft;

mounting a drive gear to the drive shaft, the drive gear unitarily rotatable therewith;

mounting a pinion gear to the spool shaft, the pinion gear rotatable thereabout, the pinion gear meshed with the drive gear, a rotation transmission mechanism including the drive shaft, the drive gear and the pinion gear, the rotation transmission mechanism configured to transmit a rotation of the handle to the rotor; and mounting a rotation control mechanism between the handle and the drive shaft, the rotation control mechanism configured to transmit the rotation of the handle to the drive shaft only when the handle is rotated in a direction corresponding to the fishing-line winding direction, the rotation control mechanism including a handle brake portion, the handle brake portion configured to apply a braking force to the rotation of the handle when the handle is rotated in a reverse direction relative to the direction corresponding to the fishing-line winding direction.

14. The method according to claim 13, wherein the rotation control mechanism includes a one-way roller clutch, the one-way roller clutch configured to transmit the rotation of the handle to the drive shaft only when the handle is rotated in the direction corresponding to the fishing-line winding direction.

15. The method according to claim 14, wherein the one-way roller clutch includes
an inner race mounted to one of the drive shaft and the handle so as to be unitarily rotatable therewith,
an outer race mounted to the other of the drive shaft and the handle so as to be unitarily rotatable therewith,
a plurality of rollers disposed between the inner race and the outer race, the rollers circumferentially aligned at intervals, each of the rollers circumferentially movable in a transmission allowed position for allowing a transmission of the rotation and a transmission prevented position for preventing the transmission of the rotation, and
a holding member arranging the rollers to be circumferentially aligned at intervals.

16. The method according to claim 15, wherein
the one-way roller clutch is constructed such that the inner race is mounted to the drive shaft so as to be unitarily rotatable therewith, and the outer race is mounted to the handle so as to be unitarily rotatable therewith, and
the handle brake portion includes
a pawl member pivotably mounted to the holding member,
a spring member including a curved part and a hook part, the curved part frictionally engaged with the reel unit, the curved part rotatable about a rotational center of the handle, the curved part configured to be loosened when the handle is rotated in the direction corresponding to the fishing-line winding direction, the curved part configured to be tightened when the handle is rotated in the reverse direction relative to the direction corresponding to the fishing-line winding direction, the hook part disposed on one end of the curved part, the hook part hooked to a tip of the pawl member,
a brake member having a ring shape, the brake member mounted to the reel unit so as to be rotatable about the drive shaft, the brake member including a plurality of internal teeth enabling the tip of the pawl member to be engaged therewith, and
an elastic ring disposed between the reel unit and the brake member, the elastic ring causing the brake member to be frictionally engaged with the reel unit.

17. The method according to claim 13, wherein the rotation control mechanism includes a handle stopper portion, the handle stopper portion configured to stop the rotation of the handle at a predetermined rotational phase when the handle is rotated in the reverse direction relative to the direction corresponding to the fishing-line winding direction.

18. The method according to claim 13, wherein the handle brake portion is a spring member mounted between the rotation control mechanism and the reel unit, and
the spring member includes
a curved part frictionally engaged with one of the rotation control mechanism and the reel unit, the curved part configured to be tightened when the handle is rotated in the reverse direction relative to the direction corresponding to the fishing-line winding direction, the curved part configured to be loosened when the handle is rotated in the direction corresponding to the fishing-line winding direction, and
a spring hook part bending from the curved part, the spring hook part hooked to the other of the rotation control mechanism and the reel unit.

19. A spinning reel for forwardly reeling out a fishing line, the spinning reel comprising:
a handle rotatably mounted to a lateral part of a reel unit;
a spool shaft mounted to the reel unit so as to be movable back and forth;
a spool for winding the fishing line, the spool mounted to a front part of the spool shaft;
a rotor that winds the fishing line onto the spool, the rotor mounted to the reel unit so as to be rotatable about the spool shaft in both a fishing-line winding direction and a fishing-line releasing direction;
rotation transmission means for transmitting a rotation of the handle to the rotor; and
rotation control means for transmitting the rotation of the handle to the rotation transmission means only when the handle is rotated in a direction corresponding to the fishing-line winding direction, the rotation control means mounted between the handle and the rotation transmission means,
the rotation control means including a handle braking means for applying a braking force to the rotation of the handle when the handle is rotated in a reverse direction relative to the direction corresponding to the fishing-line winding direction.

20. The spinning reel according to claim 19, wherein the rotation control means includes a handle stopper means for stopping the rotation of the handle at a predetermined rotational phase when the handle is rotated in the reverse direction relative to the direction corresponding to the fishing-line winding direction.

* * * * *